United States Patent [19]

O'Donoghue

[11] Patent Number: 5,867,811
[45] Date of Patent: Feb. 2, 1999

[54] METHOD, AN APPARATUS, A SYSTEM, A STORAGE DEVICE, AND A COMPUTER READABLE MEDIUM USING A BILINGUAL DATABASE INCLUDING ALIGNED CORPORA

[75] Inventor: Timothy Francis O'Donoghue, Aldershot, Great Britain

[73] Assignees: Canon Research Centre Europe Ltd., Guilford, Great Britain; Canon Europa N.V., Amstelveen, Netherlands

[21] Appl. No.: 387,717

[22] PCT Filed: Jun. 17, 1994

[86] PCT No.: PCT/GB94/01321

§ 371 Date: Feb. 16, 1995

§ 102(e) Date: Feb. 16, 1995

[87] PCT Pub. No.: WO95/00912

PCT Pub. Date: Jan. 5, 1995

[30] Foreign Application Priority Data

Jun. 18, 1993 [GB] United Kingdom ................... 9312598

[51] Int. Cl.[6] ..................................................... G06F 17/28
[52] U.S. Cl. ..................................................... 704/1; 704/2
[58] Field of Search .................................... 395/751, 752, 395/754, 760; 704/1, 2, 4, 10

[56] References Cited

U.S. PATENT DOCUMENTS

| | | |
|---|---|---|
| 5,140,522 | 8/1992 | Ito et al. . |
| 5,510,981 | 4/1996 | Berger et al. . |
| 5,541,836 | 7/1996 | Church et al. . |

FOREIGN PATENT DOCUMENTS

| | | |
|---|---|---|
| 0499366A2 | 8/1992 | European Pat. Off. . |
| 0525470A2 | 2/1993 | European Pat. Off. . |
| 4264971 | 9/1992 | Japan . |

OTHER PUBLICATIONS

"Probabilistic Method of Aligning Sentences with their Translations using Word Cognates"; IBM Technical Disclosure Bulletin, vol. 37. No. 02B, Feb. 1994; p. 509.

"A Program for Aligning Sentences in Bilingual Corpora"; by W.A. Gale et al.; Computational Linguistics; vol. 19, No. 1, Mar. 1993, Cambridge, MA; pp. 75–102.

"La comparaison de grands corpus multilingues comme instrument lexicographique: exemple d'un distionnaire he–breu–anglais/anglais–hebreu etabli semi–automatique" by J. Bajard: Sprache und Datenverarbeitung; vol. 12, No. 2, 1988, pp. 69–73, West Germany.

"Aligning Sentences In Parallel Corpora" by P.F. Brown et al.; Proceedings of the 29th Annual Mtg. of the Assn. for Computational Linguistics, Berkeley, Jun. 18, 1991, N.Y. pp. 169–176.

*Primary Examiner*—Robert A. Weinhardt
*Attorney, Agent, or Firm*—Fitzpatrick, Cella, Harper & Scinto

[57] ABSTRACT

Aligned corpora are generated or received from an external source. Each corpus comprises a set of portions aligned with corresponding portions of the other corpus, for example, so that aligned portions are nominally translations of one another in two languages. A statistical database is compiled. An evaluation module calculates correlation scores for pairs of words chosen one from each corpus. Given a pair of text portions (one in each language) the evaluation module combines word pair correlation scores to obtain an alignment score for the text portions. These alignment scores can be used to verify a translation and/or to modify the aligned corpora to remove improbable alignments.

41 Claims, 8 Drawing Sheets

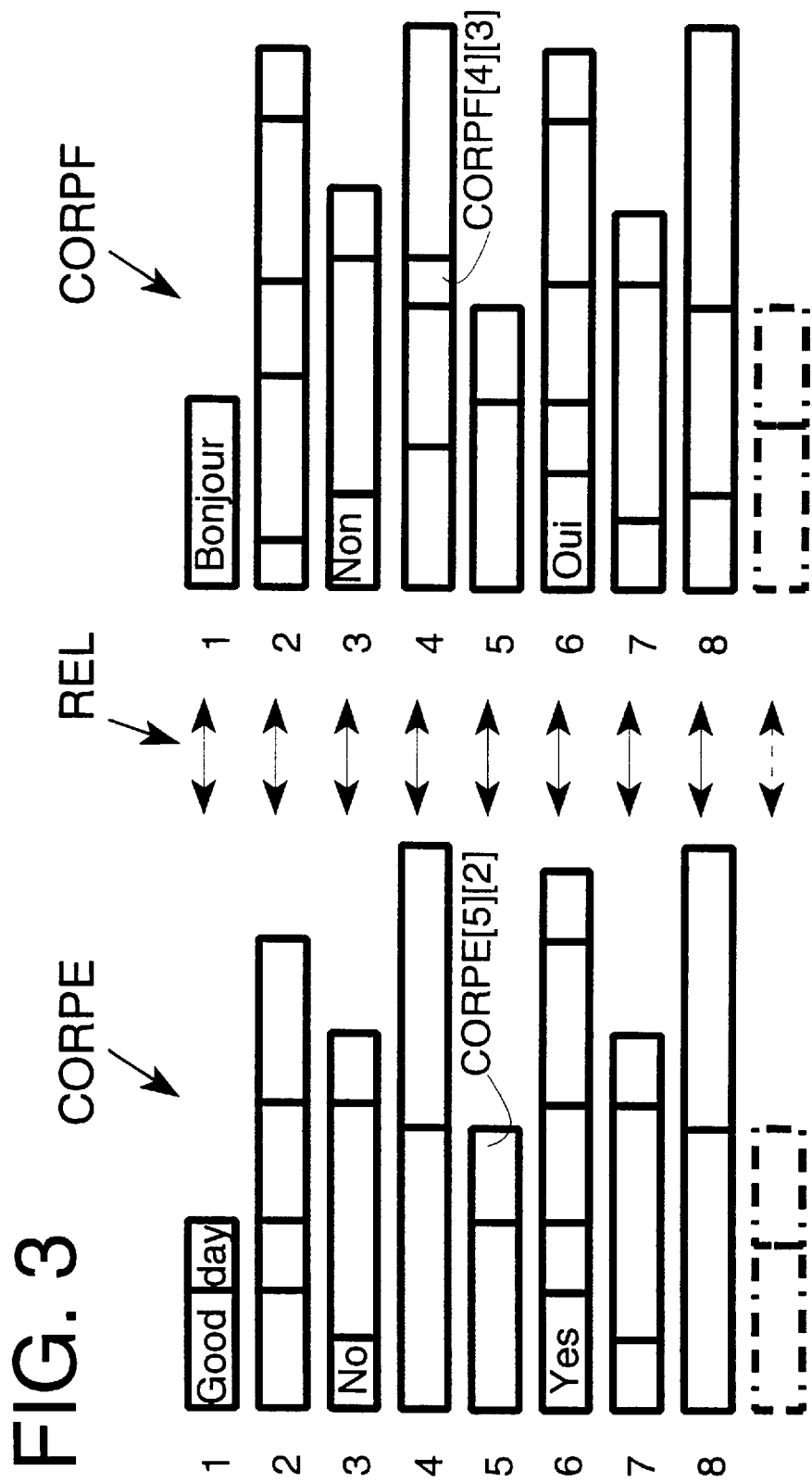

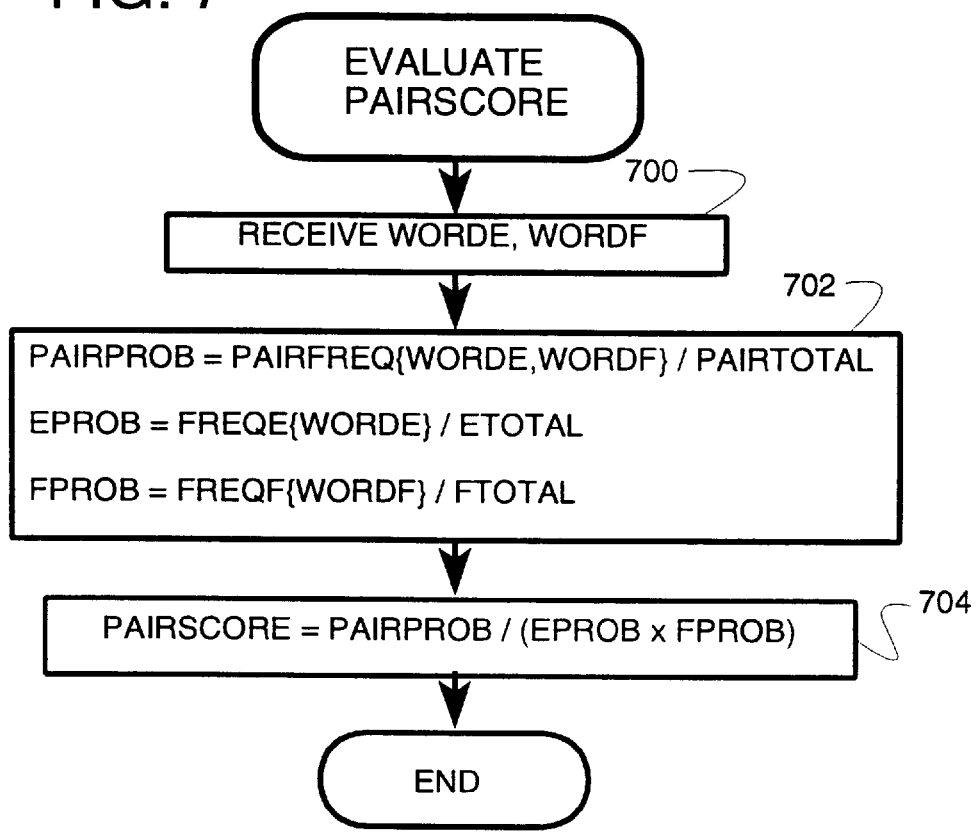

METHOD, AN APPARATUS, A SYSTEM, A STORAGE DEVICE, AND A COMPUTER READABLE MEDIUM USING A BILINGUAL DATABASE INCLUDING ALIGNED CORPORA

The invention relates to methods and apparatuses for processing a bilingual or multi-lingual database comprising aligned corpora, methods and apparatuses for automatic translation using such databases.

Aligned corpora are two (or more) bodies of text divided into aligned portions, such that each portion in a first language corpus is mapped onto a corresponding portion in a second language corpus. Each portion may typically comprise a single sentence or phrase, but can also comprise one word or perhaps a whole paragraph. The aligned corpora can be used as a database in automated translation systems in which, given a word, phrase or sentence in a first language, a corresponding translation in a second language may be obtained automatically, provided it matches or in some way resembles a portion already present in the database. This principle may be extended, such that more than two corpora are aligned to allow translation into several languages.

In the 1950s and 60s it was a common belief that the development of an all-purpose translating system would be possible in the near future. It was later realised, however, that such a system was much further in the future and possibly it would never be implemented, due to the vast quantity of background information and "intelligence" required. But it was also appreciated that aligned corpora could be used to automate translation within small, specialised fields. This follows, for example, because "problem words" which have many different meanings, would tend to have a much limited range of meanings within the confines of a specialist field of activity.

In creating such specialised translation systems, however, the problem remains of generating high quality aligned corpora in the first place, given in particular that the database generated for one field of activity should ideally be based upon a large volume of previously translated documents, and would probably not be suitable for application in another field. First, it would be necessary for users working in each field to generate their own databases and this has tended to negate the use of such automated systems, so that reliance continues to be made upon human translators. U.S. Pat. No. 5,140,522 for example, describes a machine translation system in which a database of previously translated sentences is built-up during use, but does not disclose any method of obtaining such a database without the initial effort of a human translator.

To address the above problem, a copending United Kingdom patent application now published as GB-A-2272091 describes an automated system for generating aligned corpora. The contents of GB-A-2272091 are incorporated herein by reference. The automated system responds to the formatting codes that are inserted by word processing apparatus in most documents, for example to indicate a new chapter heading or new entries in a table. For many types of text, including for example instruction manuals for electronic apparatus, the portions of text between such formatting codes are small enough to be used as the aligned portions in aligned corpora. Thus, the system described in the prior application is relatively simple, in that it is not required to judge the meanings of the words, nor parse the text into sentences or smaller units. On the other hand, for a variety of reasons, the resulting alignment will not be perfect, such that the database includes "noise" in the form of incorrect alignments.

Alternative methods of automating the generation of aligned corpora have been described for example by W A Gale and K W Church in "A Program for Aligning Sentences in Bilingual Corpora", and by P F Brown et al in "Aligning Sentences in Parallel Corpora", both in the Proceedings of the 29th Annual Meeting of the Association for Computational Linguistics, Berkeley, Calif. The system proposed by Brown et al is described more fully in European patent application EP A-0525470. In these systems, the portions used correspond to sentences, and alignment is performed by comparing the lengths of sentences, either in the number of words (Brown et al) or the number of characters (Gale and Church). Of course, the aligned corpora resulting from these methods will also include erroneous alignments, to a level of at least a few percent, according to the references.

The reference by Brown et al describes a random check performed by manual effort on a small sample of automatically generated aligned corpora (1000 out of 1000000 pairs of sentences). This effort revealed that there are errors with a certain observed probability, but, given that it would be impractical to check the entire database by human effort, it does not suggest any practical method of detecting and correcting any significant proportion of the errors. Moreover, large sections (about 10 percent of the corpora) had already been discarded, because a comparison of "anchor points" revelaed mismatch between sections. Since the method of automatic alignments proposed by Gale and Church is based on probable correlations of sentence lengths, those authors suggest that many erroneous alignments can be eliminated by simply ignoring the least probable alignments. This option may be valuable, but the quality of the database remains limited by the assumption that correlation of sentence lengths is the only key to alignment.

The translation system of Brown et al (EP-A-0525470) employs relatively complex statistical models of the source and target languages and of translations between them, such that a low level of "noise" in the database can be tolerated. For simpler, memory-based systems of the type described in U.S. Pat. No. 5,140,522 and GB-A-2272091, however, each incorrect alignment can result in a wholly incorrect translation being output for a given sentence.

The invention employs statistical techniques to detect probable errors in aligned text portions. It may be used for removing erroneous alignments from the database before use, and/or for rejecting erroneous translations which have been obtained using a "noisy" database or in some other way. In particular embodiments the invention allows a score to be derived to measure the correlation of bilingual word pairs. Word pair scores can then be combined to derive a score for any proposed pair of aligned portions. The portions may be received externally, or may be aligned portions from the database itself. Alignments which appear to be erroneous, in comparison with the statistics of the database as a whole, can be removed from the database.

The invention therefore allows improvement of databases comprising aligned corpora, with minimal human intervention and processing requirement. In particular, even when the processes implemented remain statistically based and the processor remains oblivious to the semantics and syntax of the corpora, it has been found in practice that the generation of high quality aligned corpora can be performed quickly by relatively inexpensive processing equipment.

Because the technique can be implemented independently of whatever technique was used to generate the aligned corpora from previously translated documents, it can be used to improve existing databases, and will detect errors not suggested by the apparatus which performed the original alignment.

It is noted that EP-A-0499366 (The British and Foreign Bible Society) describes a process for checking a bilingual corpus that has been produced by translation. This process calculates scores for pairs of words and, by an iterative process, builds up a "dictionary" of translations. This is then used to highlight possible inconsistencies in the translation of certain words.

The invention further provides translation methods and apparatuses, processed databases and the like, as set forth in the dependent claims.

Embodiments of the invention will now be described, by way of example, with reference to the accompanying drawings in which:

FIG. 3 shows a database structure including a pair of aligned corpora;

FIG. 7 is a flowchart illustrating part of the operation of an evaluation module in the system;

Tables 1–8 presents an example of aligned corpora in English and Dutch, and the results of operation of the analyser and evaluation module for that example.

Figure 1:
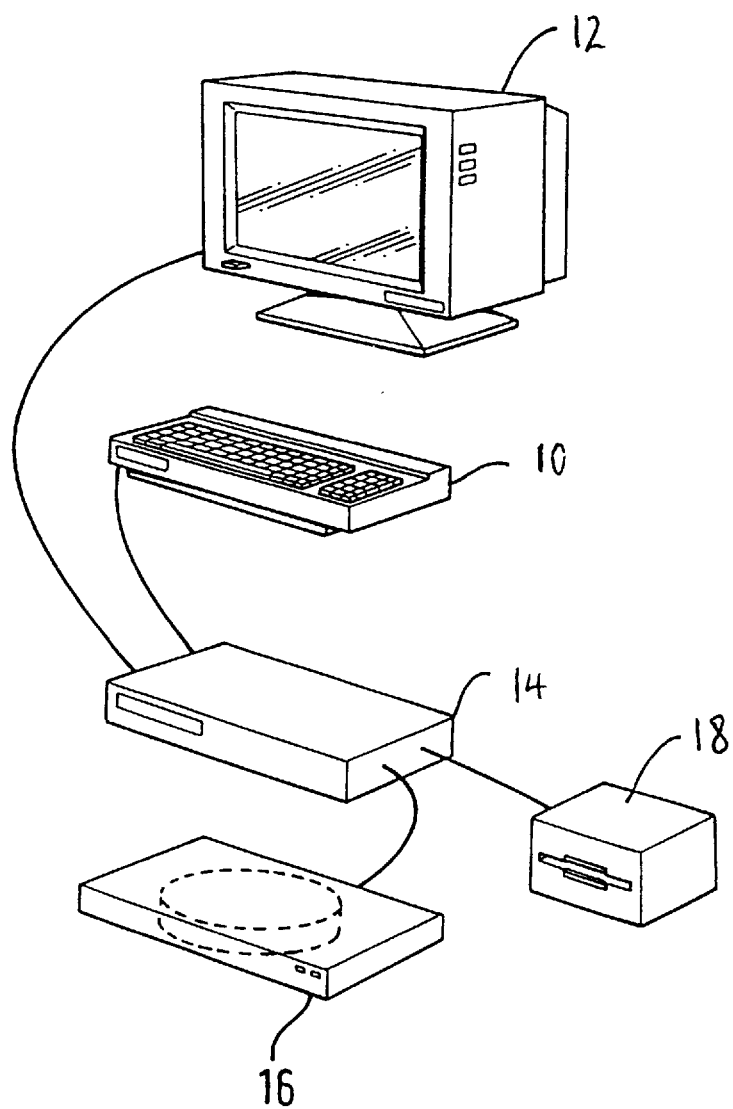
FIG. 1 shows the hardware elements of a translation system embodying the invention.

In the system of FIG. 1, user interaction is by means of a keyboard 10 and display screen 12. A processor unit 14 comprises a central processor (CPU), semiconductor memory (RAM and ROM) and interface circuitry, all of conventional construction. A magnetic and/or optical disc memory 16 provides mass storage for storing multi-lingual databases, texts to be translated, and programs for controlling the operation of the system as a whole. A removable disc memory 18 is provided for the communication of new data and programs to and from the system.

Figure 2:
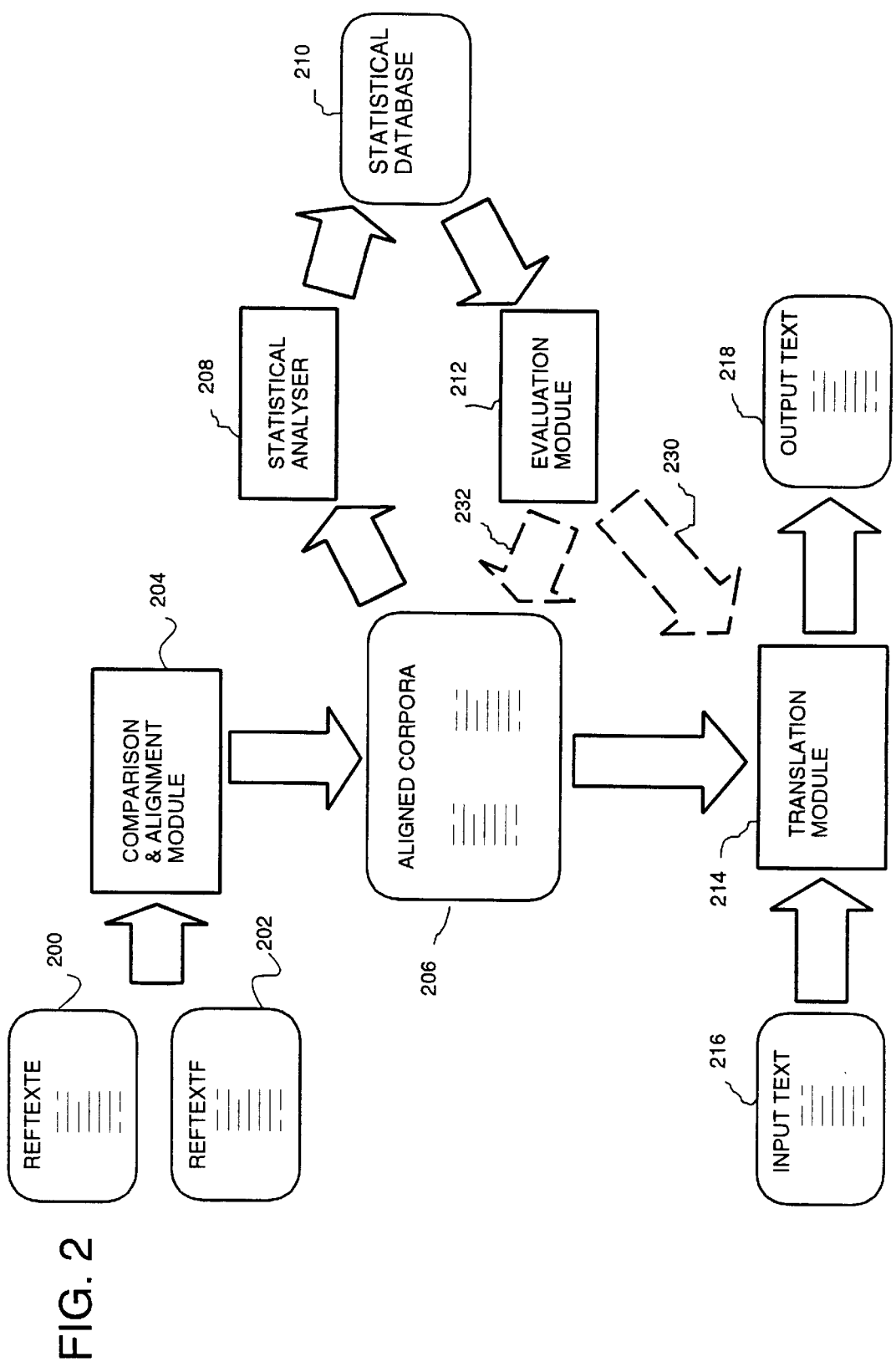
FIG. 2 shows the operational structure of the system of FIG. 1.

It is an advantage of the present embodiment that the above mentioned hardware elements of the system may be commercially available already, in the form of a personal computer or workstation-type computer. FIG. 2 shows the operational structure of the system of FIG. 1. The system stores source data including one or more reference texts which already exist in two or more languages. For example a text REFTEXT1E shown at 200 in FIG. 2 is an English translation of a French document REFTEXT1F stored at 202. An alignment module 204 is provided which can read such pairs of texts and generate corresponding aligned pair of corpora, shown at 206 in FIG. 2. The aligned corpora 206 form the major part of a bilingual database to be used for a translation of a new document.

An analyser module 208 is provided which generates for the aligned corpora 206 a statistical database 210. An evaluation module 212 is provided which uses the information in the statistical database 210 to measure a quality of alignment in the aligned corpora, or in other texts. A translation module 214 is provided which reads an input text (for example via the magnetic disc drive 18), to generate an output text file 218. Interaction with a human operator is possible for any of the modules, for example so that the translation module 214 can consult with a skilled human translator.

It will be appreciated that a variety of structures are possible in practice, for example, the translation module and the analysis and evaluation modules 204, 208 and 212 may be provided in separate apparatuses, with the database information 206 and/or 210 being generated in one apparatus and communicated to a second apparatus for use in translation. This is useful in practice, in that the aligned corpora can be generated and evaluated and maintained centrally and then distributed with documents for translation to skilled translators and editors, who tend to work remotely, for example, with the translation module 214, at their homes or small offices, with personal computers and the like.

As mentioned above, the aligned corpora generator 204 may be of known design, for example as described in prior application GB-A-2272091 or as described in the papers by Gale and Church or Brown et al. Moreover, the method by which the original aligned corpora are generated is not relevant for an understanding of the present invention and will not be described in detail. FIG. 3 shows schematically the structure of the bilingual database 206 insofar as it contains a pair of aligned corpora. The example of FIG. 3 is small and presented schematically only, while a small but complete example will be described later, with reference to the Tables.

In FIG. 3, an English corpus CORPE comprises a plurality of portions of text, which are addressable by number and will be referred to as "chunks" CORPE[I], where I equals 1, 2, 3 etc. Depending on the method by which the aligned corpora were generated, each chunk may correspond approximately to a sentence of an original source document, or to a longer or shorter portion of text. Either way, each chunk CORPE[I] comprises a variable number of smaller elements referenced CORPE[I][J]. These smaller elements are, in the present example, individual words of English text. Thus, for example, the chunk CORPE[1] comprises two words: CORPE[1][1] is "Good" and CORPE[1][2] is "day". CORPE[3][1] is the word "No", while CORPE[6][1] is the word "Yes". Words CORPE[5][2] and CORPF[4][3] are labelled in the Figure for further illustration.

On the other side of FIG. 3 a second, French language corpus CORPF contains an identical number of chunks CORPF[I], each of which corresponds to the like-numbered chunk CORPE[I] of the English corpus. In particular, a relationship REL specifies that each English chunk CORPE [I] is, at least in some nominal sense, a translation of the corresponding French chunk CORPF[I]. While each chunk is aligned with exactly one chunk in the opposite corpus, the number of words within aligned chunks need not be the same. For example, the first chunk in the French corpus comprises the single word "Bonjour", while the first chunk in the English corpus comprises the two words "Good" and "Day", as shown. The references also describe examples where a portion comprising one sentence is aligned with a portion containing two sentences.

It should be appreciated that the alignment of chunks in the aligned corpora CORPE and CORPF is nothing more than that. The alignments have not been verified individually by a skilled human translator, and are only the "guesswork"

of an automated comparison of the type described in the references. Clearly, the alignment does not prove that the two chunks are translations of one another, and does not even begin to represent any particular relationship between individual words of the aligned chunks. Thus, for example there is no suggestion in the database that the words "Yes" and "Oui" are translations of one another, merely that they both happen to appear as the first words in corresponding chunks of the aligned corpora.

Figure 5:
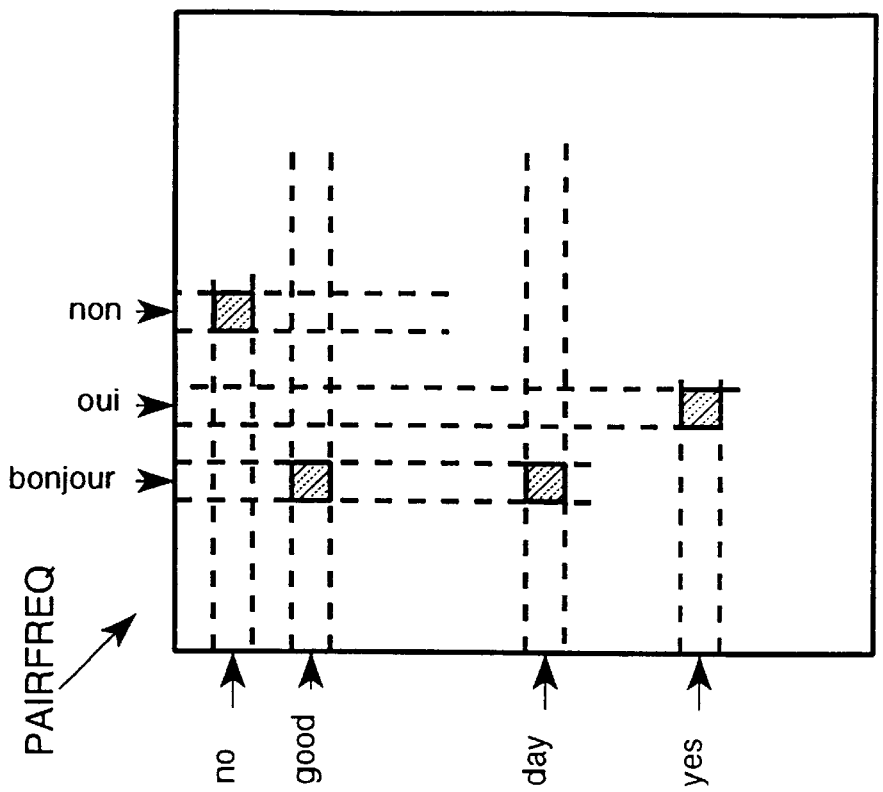
FIG. 5 shows a pair frequency table for the database of FIG. 3.
Figure 4:
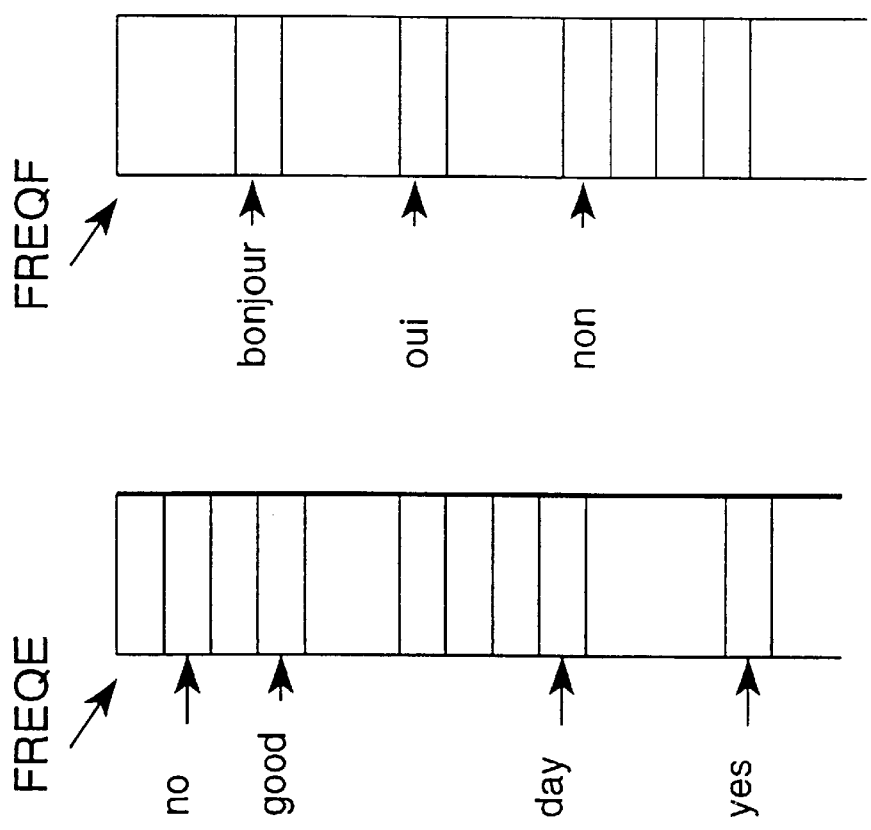
FIG. 4 shows word frequency tables for the database of FIG. 3.

FIGS. 4 and 5 illustrate the output of the statistical analyser 208, which in the present embodiment produces frequency tables as follows. Table FREQE (FIG. 4) is a table of word frequencies for the English corpus CORPE. The index to an entry in table FREQE is a single word from the English corpus, and the entry stored under that word is the number of occurrences of that word in the corpus. Several conventional programming languages are known which provide for such so-called "associative addressing". These languages include Lisp, POP-11, PERL, AWK. Of course, in environments where associative addressing is not provided, it can be implemented explicitly by the system designer.

A second word frequency table FREQF contains the word frequencies for the French corpus CORPF. The tables are not case-sensitive in the present embodiment so that "Yes" and "yes" are treated as the same word. The associative addressing is indicated herein by use of "braces" or curly brackets { }.

A third table PAIRFREQ (FIG. 5) stores the word pair frequencies for the aligned corpora. This is a conceptually two-dimensional table, of which each entry is associatively addressable by a word pair; one word from the English corpus CORPE and another word from the French corpus CORPF. For a given word pair, for example "good" and "bonjour", the table entry PAIRFREQ{good,bonjour} stores a number of times that those two words appear in corresponding chunks of the aligned corpora.

Shaded boxes in FIG. 5 indicate entries corresponding to the few words shown in the example corpora of FIG. 3. Thus the entry PAIRFREQ{good,bonjour} includes a value of at least 1, since these two words occur in the first pair of aligned chunks CORPE[1] and CORPF[1]. Similarly, PAIRFREQ{day,bonjour} contains a value of at least 1, since this word pair also occurs in the first pair of aligned chunks.

For each corpus, the total number of words is stored, which will equal the sum of all entries in table FREQE or FREQF as the case may be. Similarly a total of all word pairs is recorded, which is naturally the sum of all entries in the two dimensional pair frequency table PAIRFREQ.

The person skilled in the art will appreciate that, to implement the table PAIRFREQ actually as a two-dimensional table would result in a very sparse array. A more efficient implementation may be adopted in which the table PAIRFREQ is a one-dimensional associative array, similar to the arrays FREQE and FREQF. This can be achieved very simply by concatenating the words of a pair into a single string to index the table. Thus, for example, instead of "good" and "bonjour" being independent components of a two-dimensional address {good, bonjour}, the entire string "good_bonjour" can be treated as a single, one-dimensional item for associative addressing of the corresponding entry in the table PAIRFREQ.

Figure 6:
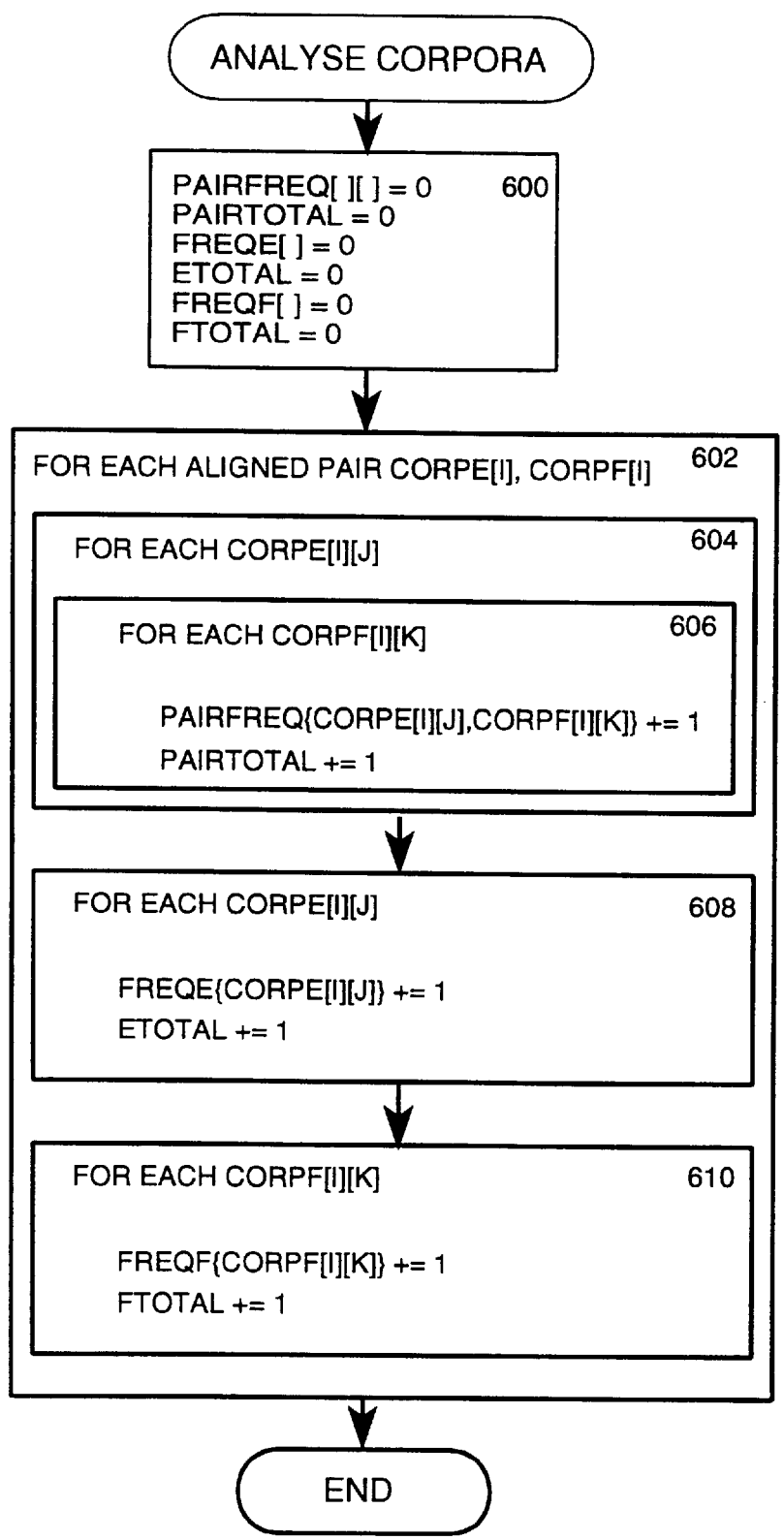
FIG. 6 is a schematic flowchart illustrating the operation of a statistical analyser of the system.

FIG. 6 illustrates in schematic flowchart form the operations of the statistical analyser 208, as it generates the statistical database 210 from the aligned corpora CORPE and CORPF. In an initialisation step 600 space is reserved for the pair frequency table PAIRFREQ, and all entries thereof are zeroed. Similarly space is reserved for the word frequency tables FREQE and FREQF, and the entries of these are zeroed also. A pair counting variable PAIRTOTAL is established and set to 0, as are word counting variables ETOTAL and FTOTAL.

The remainder of the process comprises a series of nested loops. A main loop 602 is executed once for each aligned pair of chunks CORPE[I] and CORPF[I], where I is incremented each time through the loop from one upwards, until every aligned pair of chunks has been considered. Within the main loop 602 a further loop 604 is executed once for each word CORPE[I][J] within the current chunk of the English corpus. Within the loop 604, a yet further loop 606 is executed once for each word CORPF[I][K] of the corresponding chunk in the French corpus CORPF. Within this inner loop 606, an entry corresponding to the current word pair in the pair frequency table PAIRFREQ is incremented by 1. As noted above, the array PAIRFREQ is addressable associatively by reference to an English-French word pair. Also within the loop 606, the counter variable PAIRTOTAL is incremented.

Outside the loops 604 and 606, but still within the main loop 602, a further loop 608 is executed once for each word CORPE[I][J] in the current chunk of the English corpus. An entry in the word frequency table FREQE is incremented by 1, and the total word count ETOTAL for the English corpus is incremented also. After completion of the loop 608, a further loop 610 within the main loop 602 is executed once for each word CORPF[I][K] within the French corpus. Within this loop the entry in the word frequency table FREQF is incremented to record the occurrence of the word CORPF[I][K], and the total word count FTOTAL for the French corpus is also incremented.

Therefore, once the main loop 602 has been executed for every aligned pair of chunks in the aligned corpora CORPE and CORPF, the table PAIRFREQ contains a record of the number of occurrences of every unique word pair in aligned chunks, table FREQE records the number of occurrences of each unique word in the English corpus, and table FREQF records the number of occurrences for each unique word in the French corpus. At the same time the total number of word pairs is recorded in variable PAIRTOTAL, the total number of words in the English corpus is recorded in variable ETOTAL and the total number of words in the French corpus CORPF is recorded in the variable FTOTAL.

Figure 8:
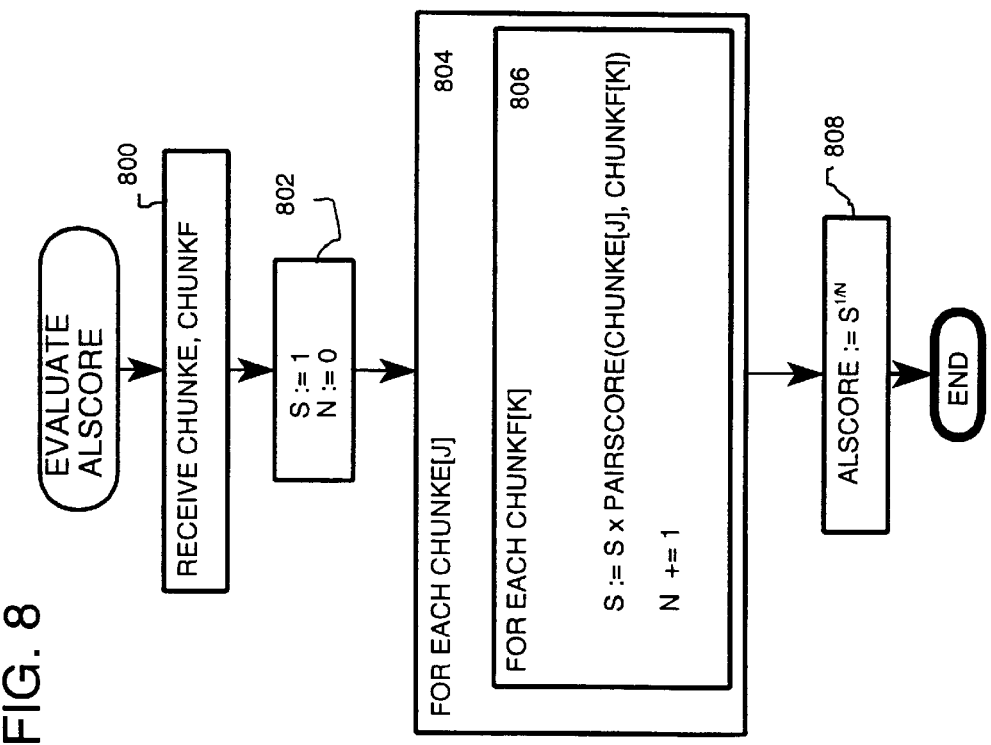
FIG. 8 is a flowchart illustrating another part of the operation of the evaluation module.

FIGS. 7 and 8 illustrate the operation of the evaluation module 212 shown in FIG. 1, in particular in that FIG. 7 illustrates the calculation of a correlation measure or "score" for each word pair, and FIG. 8 illustrates the calculation of a score for each aligned pair of chunks, using the pair scores of the word pairs contained therein.

In FIG. 7, the operations begin with the step 700, in which a pair of words WORDE and WORDF are received. In step 702, three probability values are calculated, using the tables of the statistical database 210. A pair probability value PAIRPROB is calculated for the word pair by dividing a word pair frequency PAIRFREQ{WORDE,WORDF} recorded in the pair frequency table (FIG. 5) by the total number PAIRTOTAL of word pairs recorded in that table. PAIRPROB thus measures the observed probability of the received word pair occurring in any two aligned chunks in the aligned corpora of the database.

A value EPROB is calculated by dividing the frequency of occurrence of the English word WORDE alone in the English corpus by the total number of words in the English corpus. That is to say, the table entry FREQE{WORDE} is divided by the value ETOTAL. The value EPROB thus measures the probability of the English word of the received pair occurring on its own in the English corpus. Similarly for the French word WORDF of the received word pair, probability value FPROB is calculated by dividing a table entry FREQF{WORDF} by the total number FTOTAL of words in the French corpus. Value FPROB measures the probability of the word WORDF occurring, based on the contents of the French corpus CORPF.

Finally, in step 704, a scoring value PAIRSCORE for the received word pair WORDE, WORDF is calculated by dividing the pair probability value PAIRPROB by the individual word probability values EPROB and FPROB. A value PAIRSCORE equal to unity would indicate that a frequency of occurrence of this word pair in aligned chunks is no more than would be expected by random chance based on the observed probabilities of the individual words occurring in their respective corpora. On the other hand, a value PAIRSCORE greater than unity will indicate that the frequency of occurrence of this pair of words is greater than would be expected from the individual word frequencies. Thus the pair score is a measure of correlation between the two words of the pair.

Turning to FIG. 8, the statistical database and the pair scoring method of FIG. 7 can be used to measure the quality of alignment of two chunks of text each comprising one or more words in a respective language for example, English and French. The operations of FIG. 8 begin in step 800 where two chunks of text CHUNKE and CHUNKF are received for the module 212 to evaluate their alignment score. In an initialisation step 802 a score variable S is set to 1, and a counting variable N is set to 0.

Once the initial values are established for S and N, these variables are modified by a nested pair of loops 804 and 806. The outer loop 804 is executed once for each word CHUNKE[J] in the English language chunk of text received in step 800. The inner loop 806 is executed once for each word CHUNKF[K] in the French language chunk received in step 800. Within the nested loops 806 and 804, therefore, every word of the English chunk is considered together with every word of the French chunk. The value of S is multiplied by the pair score PAIRSCORE(CHUNKE[J],CHUNKF[K]) for each word pair considered. This pair score is calculated using the steps of FIG. 7. At the same time, the counting variable N is incremented by 1 to maintain a count of the number of scores which are combined in the variable S.

After each word pair in the two received chunks has been considered and its pair score combined into the product S, an alignment score ALSCORE is calculated in step 808 by taking the Nth root of the product S. In mathematical language, the alignment score ALSCORE is the "geometric mean" of the pair scores PAIRSCORE of all word pairs in the received chunks. Thus, the alignment score ALSCORE for a pair of chunks of text is a "likelihood" measure combining the pair scores of all the possible word pairs between the two chunks. Since the geometric mean is taken in step 808, the values ALSCORE are normalised in a manner similar to the pair scores, such that a value ALSCORE of unity indicates that, based on the word frequencies and word pair frequencies recorded in the statistical database 210, that the two chunks received in 800 are only as likely to correspond would be expected from the individual word probabilities. On the other hand, an alignment score greater than unity suggests that there is on average a degree of correlation between the words of the two chunks, more than would be suggested by random chance and the observed word frequencies alone.

The product S may attain large values, and the calculation of many multiplications and divisions is generally cumbersome in an automatic processing apparatus. It may be advantageous in practice for the geometric mean calculation in step 808 to be performed by calculating the arithmetic mean of the logarithms of the pair scores. Logarithms can be added and subtracted to effect multiplication and division. The logarithm of S can be divided by N to obtain the logarithm of the Nth root of S.

It should be noted that, while the frequency tables and count values of the statistical database 210 are derived from the source corpora 200 and 202 and the alignments indicated between them, the word pairs received in step 700, and the chunk pairs received in step 800 can be derived from the aligned corpora themselves, or alternatively from any pair of texts whose alignments are being evaluated. Thus, for example, the received chunk CHUNKE might be the result of a human translator translating the received CHUNKF, and this compared with the statistical database of the existing aligned corpora CORPE and CORPF by means of the alignment score ALSCORE. A value greater than 1 indicates that the human translator is broadly in agreement with the existing aligned corpora, while a score much less than unity would indicate disagreement, for example because of errors in the alignment of the corpora, errors in the human translation, or simply a difference in the two fields of subject matter being considered in the existing database and in the mind of the translator. There are many applications for the evaluation module 212 and the techniques of FIGS. 6, 7 and 8 as the following examples will show.

Figure 9:
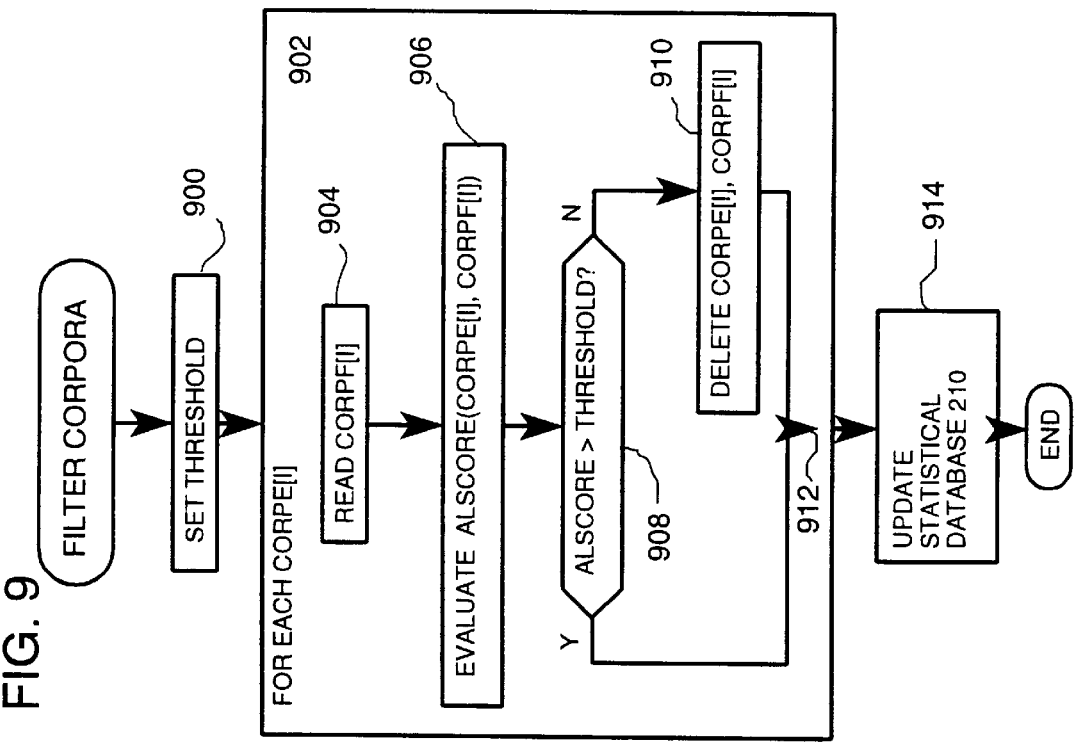
FIG. 9 is a flowchart illustrating the modification of the database using the evaluation module.

FIG. 9 shows a method of using the evaluation module 212 to improve or "filter" the existing database, that is the aligned corpora 206 and the statistical database 210. Such a process represents a form of feedback, and is indicated by the broken arrows 230 and 232 in FIG. 2. In step 900, a threshold is set for comparison with alignment score values. Many possible ways of choosing the threshold are possible, as will be described below. For the present description, simply setting the threshold to unity will be sufficient, but in general, the best threshold will be dependent on the actual data. The process next executes a loop 902, once for each chunk CORPE[I] in the English corpus for which there is an aligned chunk CORPF[I] in the French corpus. Within the loop 902, step 904 reads the aligned chunk CORPF[I], and in step 906 the alignment score ALSCORE(CORPE[I], CORPF[I]) is evaluated using the procedure of FIG. 8 for the present pair of chunks.

In step 908 this alignment score is compared with the threshold set in step 900. If the alignment score exceeds the threshold, control continues to 912 whereupon the loop 902 is executed for the next value of I, that is to say for the next pair of aligned chunks in the aligned corpora 206. If the alignment score is below the threshold in step 908, control passes to step 910, and the current pair of aligned chunks is deleted from the aligned corpora, or at least marked as being suspect for deletion later. This latter option may be convenient in a given implementation, and would also allow dialogue with a human translator, before a decision is finally taken.

After step 910 is completed, control again passes to point 912, where I is incremented and the loop 902 is executed for the next pair of aligned chunks. When all aligned chunks in the aligned corpora 206 have been considered in the loop 902, control passes to step 914, where the statistical database 210 is updated to take account of the deletions (if any) performed in step 910.

Note that the method of FIG. 9 can be repeated on the database any number of times, gradually to filter out the "noise" which exists in the inaccurate alignment of certain chunks. The sources of noise are many, but are generally the result of the fact that the automated process implemented in module 204 to generate the aligned corpora 206 has no knowledge of the languages which it is processing, and pays no regard to syntax and semantics when choosing which chunks of text to align. Also, even for properly aligned chunks, the original translations will not always be literal translations, and certainly there may be several ways of translating even a short sentence into a given language.

In the case of corpora derived from operating manuals for electronic equipment such as photocopiers and facsimile machines, for example, there are often parts of text which do not correspond at all, for example, because the legal requirements in different countries require different safety messages to be presented. Another common source of noise is where part of each corpus is a list of items arranged in alphabetical order. The order of these items will not be the same in two different languages, even though the number of items and their general appearance may be indistinguishable to the alignment module 204.

Provided these problems are confined to relatively small parts of the source documents, however, it has been found that the statistical database remains useful, and that the alignment scores generated by the evaluation module 212 will successfully identify the problem areas.

Figure 10:
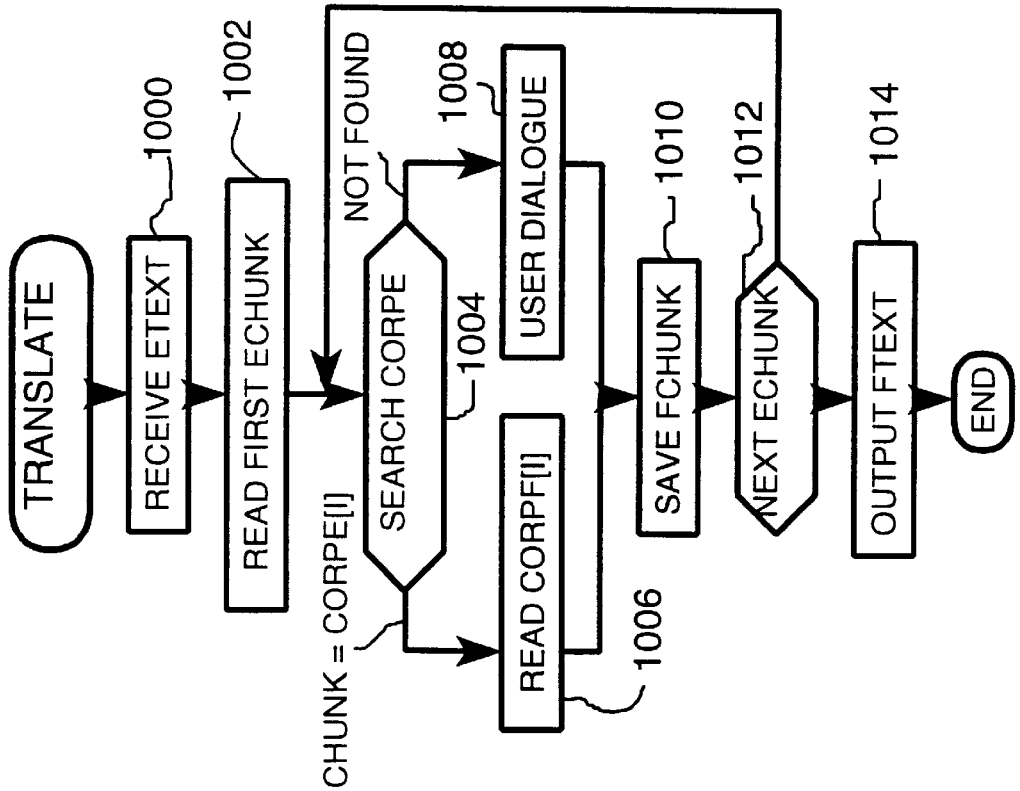
FIG. 10 is a flowchart illustrating translation of a text using the modified database.

In addition to filtering the aligned corpora, the alignment scores for a pair of chunks can be used during the translation of a new text using the aligned corpora, as shown in FIG. 10.

In FIG. 10 a new text ETEXT (216, FIG. 2) to be translated by translation module 214 from English to French is received at step 1000. A first chunk ECHUNK of the English text is identified at step 1002 and at step 1004 the existing aligned English corpus CORPE is searched for any occurrence of this chunk. If it is found that for some value I the chunk CORPE[I] of the English aligned corpus is equal to the received chunk ECHUNK, control passes to step 1006 where the corresponding chunk CORPF[I] of the French corpus is read. In step 1010 this chunk is saved as a corresponding chunk FCHUNK of the desired French translation (output text 218).

If the search in step 1004 does not find an equivalent of the current chunk ECHUNK, control passes to a user dialogue step 1008. Here a human translator is asked to supply a translation for the English chunk ECHUNK, which translation is then saved in step 1010 as a translation FCHUNK. At step 1012 a next English language chunk is identified in the received text ETEXT, and control returns to the search step 1004. When the entire input text ETEXT has been translated, the concatenation of all the chunks FCHUNK saved in step 1010 is output as a translated, French language text FTEXT in step 1014.

Note that the translations supplied by the user in step 1008 may also be used to augment the existing database, by adding the unfamiliar English language chunk CHUNKE and the user-supplied French translation to the aligned corpora 206. Such behaviour is described in U.S. Pat. No. 5,140,522, for example. The statistical database 210 can also be updated at this stage. Note also that, as an alternative to performing user dialogue "live" during execution of the method of FIG. 10, the output file FTEXT may simply contain questions for a human translator to consider at a later date. Further, the step 1010 of saving the translated chunk FCHUNK may for example include a step of evaluating an alignment score for the chunks ECHUNK and FCHUNK, to verify that this is indeed a likely translation. In the event that the alignment score falls below a predetermined threshold, user dialogue may be entered into, either "live" or by entering suitable questions in the output file FTEXT. This may serve to correct erroneous alignments not removed by the filtering process of FIG. 9.

The skilled reader will be able to identify many variations on the above embodiments, and many other applications of the analysis and evaluation apparatus suggested in the present disclosure.

One such variation, appropriate in the case of large databases (particularly where the chunks contain a relatively large number of words) limits processing effort by considering less than all of the possible word pairs. This can be done in a number of ways, but a simple step is to limit the range of K in the innermost loop 606 in the flowchart of FIG. 6, for example such that K varies from J−d to J+d, for some integer d.

Then, instead of counting every word of the French chunk as a pair with the current English word CORPE[I][J], only a limited "window" of words CORPF[I][K] will be considered and counted. As the current English word index J advances with each iteration of the outer loop 604, so the "window" of French words advances with it. Of course, this implementation will be most suitable for pairs of languages where the word order in typical sentences follows similar rules. For languages where the number of words in aligned portions is significantly different, the window (range of K values) can be arranged to advance at an appropriate rate, so that its position relative to the maximum value of K matches roughly the value of J, relative to the maximum value of J.

A further technique to reduce the number of pairs considered is to ignore very common words such as "the", "and" and so on. The less frequent words are assumed to carry a greater burden of information. As an example, the English sentence: "The man killed a big dog" can be reduced to "man killed big dog" with little loss of meaning.

To implement this variation in the flowchart of FIG. 6, it may be convenient to generate the word frequency tables (FREQE,FREQF) for the two corpora (steps 602, 608, 610) before the word pair frequency table (PAIRFREQ, steps 602, 604, 606). These tables can then be used to identify the most common words to be ignored in the generation of the pair frequency table. Alternatively, pre-existing word frequency tables may be available, either for the same corpora or for the relevant language in general.

Both of these (and other) variations can be combined if desired. Corresponding techniques can be implemented in the inner loop 806 of FIG. 8, to reduce the effort of combining word pair scores to obtain an alignment score for a pair of text chunks.

This description will now conclude with a consideration of Tables 1–8 an actual example of two relatively small aligned corpora, and the evaluation thereof as performed by the system described above. The corpora of Tables 1–8 comprise the contents listing of an operating manual for a facsimile apparatus, the first in the English language and the second in the Dutch language. These corpora are presented in Tables 1 and 2 respectively, with line numbers 1 to 30 indicating the aligned pairs of chunks 1 to 30 in the two corpora. An incorrect alignment is present in line 30, in that "sending documents" is not an English translation of the Dutch phrase "problemen oplossen". As will generally be the case, the aligned corpora do include elsewhere correct alignments of chunks including the words "problemen" and "oplossen", namely "troubleshooting" (chunk pairs 23 and 27).

In Table 3, the word frequencies for the English corpus are presented. It will be seen for example that there are seven occurrences of the word "sending" and only one occurrence of the word "confidential". The total number of words in the English corpus is 118. Thus, for example, the probability of occurrence of the word "sending" in the English corpus is 7 divided by 118, or 0.059322.

In Table 4, the word frequency table for the Dutch corpus is presented. In the Dutch corpus there is a total of 106 words. Thus, for example, the word "problemen", with a frequency of 4 out of 106 words, has an observed probability of 0.037736. Note also that in the example system the statistical database is not case-sensitive. That is, there is no distinction between "Problemen" in chunk 23 of the corpus and "problemen" in chunk 6.

At E-1 to E-4 in the Tables, there is presented the table of word pair frequencies for the aligned corpora, in which there are a total of 427 unique word pairs. The total of all word pair frequencies is 510. Note that in cases where the corpora employ a larger vocabulary, as will normally be the case, the number of word pairs present will escalate dramatically.

The word pair frequency table of Tables 4 shows for example that there are four pairs of chunks in which the English chunk contains the word "part" while the corresponding Dutch chunk contains the word "en". A quick inspection of the two corpora (Tables 1 and 2) shows that this pair of words occurs in the aligned chunks 2, 3, 5 and 6. Note, however, that the database makes no representation that the words "part" and "en" are translations of one another. It happens that both words are common in their respective corpora, so that there is a reasonable probability of both words occurring purely at random in any pair of chunks.

At F-1 to F-4 in the Tables, the word pair scores, measuring correlation between two words, are calculated and shown for the 427 different word pairs in the example corpora. Whereas in Table 4 the pairs were arranged in pair frequency order, in Table 5 they are arranged in descending order of pair score. Compared with the frequency table, it may be noted that there is a much greater tendency for words which are actually translations of one another to attain a high score. The scores range from 24.525490 down to 0.383211. There is, however, no possibility of using individual word pair scores from Table 1 to verify the accuracy of any word-by-word translation.

In contrast, in Tables 7 and 8 the aligned chunks are presented separately, together with an alignment score for each chunk. These chunk alignment scores have been obtained in the manner of FIG. 8, by accumulating the pair scores for all the word pairs in each pair of chunks. Chunk 1, has a score of 10.071629 which indicates that, compared with the statistics of the database a whole, it seems likely that the two aligned chunks are indeed useful as translations of one another. It will be noted that all of the aligned chunk pairs except the last one have scores well in excess of 1. On the other hand, the chunk pair number 30 which is known to the reader as an error, has a score of only 0.819339. Thus, even from this very small database, which contains at least one incorrectly aligned pair of chunks, the evaluation techniques and apparatuses proposed herein have provided a clear highlighting of the incorrect translation.

Figure 11:
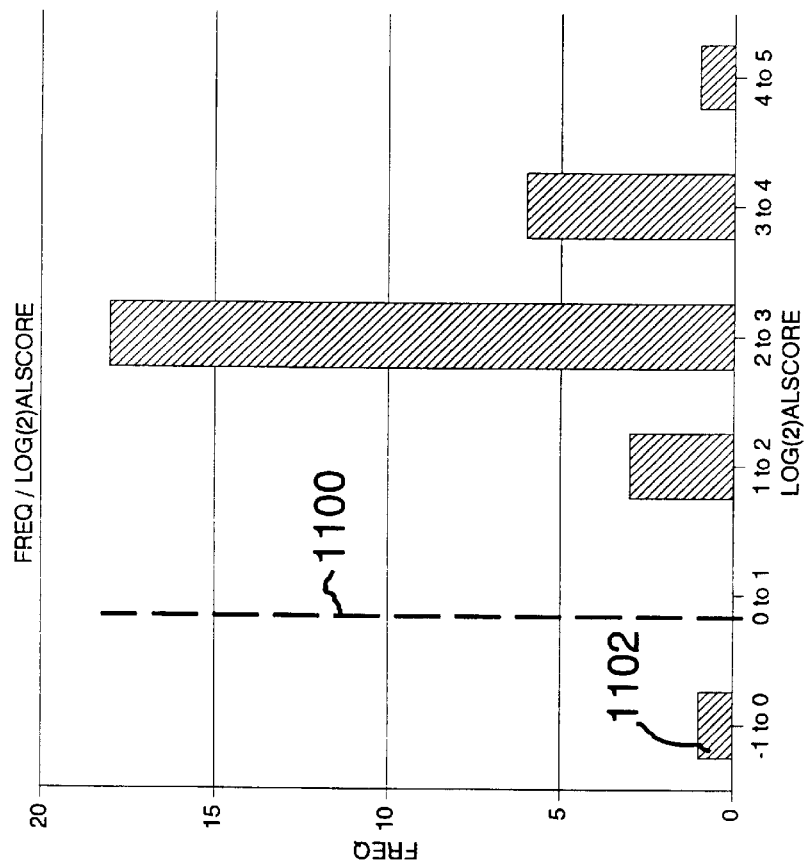
FIG. 11 is a histogram of alignment scores in an example database.

FIG. 11 is a histogram showing graphically the distribution of alignment scores for the 30 chunks of the example corpora. The vertical axis plots frequency, while the horizontal axis for convenience plots the logarithm (base 2) of the alignment score. For example a range 3 to 4 in the logarithm of the alignment score (horizontal axis) corresponds to the range 8 to 16 in the alignment score itself. A vertical dashed line 1100 indicates a threshold value of 0 in the logarithm of the alignment score, which corresponds to a unity value threshold of the alignment score itself mentioned above (log1=0). To the right of the threshold line 1100, a main body of the frequency distribution is clearly separated from a smaller peak 1102 to the left of the threshold, which marks the low alignment score of the chunk pair number 30.

Those skilled in the art will appreciate that alternative thresholds may be desirable or necessary, depending on the contents of the statistical database. In many cases, it should be possible to distinguish, as in the present example, between a main body of the distribution of alignment scores in the aligned corpora, and a secondary distribution which is due to erroneous alignments. In the event that these two populations are clearly separated, as in the present example, it is a simple matter to set the threshold between the two.

In other cases, a more subtle approach to setting the threshold may be necessary. One such approach would be to set a percentile threshold, for example, by choosing that the most improbable five percent of alignments should be rejected. The alignment score threshold can then be set accordingly, or may simply be implicit in the action of deleting the worst five percent of alignments.

It may even be desirable in some cases not to set a rigid threshold at all, but to employ dialogue with a human translator to decide which alignments are correct. The system then might operate by presenting pairs of aligned chunks to the human translator starting with the chunks having the lowest alignment score. Typically, the first pair presented will be readily rejected as erroneous. Then, as the alignment score for the presented chunk reaches higher values, the human translator will begin to be presented with pairs which, are correct, but happen to have a relatively low alignment score (for example pair number 2 in the example in Tables 7 and 8).

Further on in the process, the majority of pairs being presented to the user will be correct, and it is a matter of choice for the system designer and/or operator, at what point a cut-off is made and the remaining alignments are deemed to be correct. In any event, the proportion of the database that actually has to be verified by a human translator has, by use of the invention, been reduced to a small, manageable fraction whereas to verify the whole database would be impracticably expensive or time-consuming.

For those errors that remain, another iteration using the modified corpora and an updated statistical database may be a more efficient way to eliminate these than would forcing the operator to verify many more pairs in the search for a few more errors. Also, after a few errors are removed, and the statistical database has been updated, the alignment scores for pairs which are correct but scored lowly at first may improve at subsequent iterations, because the statistical database itself is now the product of a less noisy database. Thus, on a second iteration, the human translator is less likely to be presented with pairs which are in fact correctly aligned.

Again, many variations on the above implementations are with the capabilities and imagination of the person skilled in the art. For example, as an alternative to the method embodied in FIGS. 6 and 7 for obtaining word pair scores, a method such as that used in EP-A-0499366 might be used to similar effect. Depending on the exact method used to obtain the word pair scores, the method of combining word pair scores to obtain scores for aligned sentences may also need to be adapted, for example as mentioned above in relation to logarithms. Similarly, pre-processing techniques to identify words having a common "stem", on the basis of statistics or morphological knowledge, could also be employed, as described in the vairous references. The above examples are presented by way of illustration only.

TABLE 1

THE ENGLISH CORPUS

1 Part 1 Before Starting
2 Part 2 Sending and Receiving Documents
3 Part 3 Using the Telephone and Copying Features
4 Part 4 Using the Memory and Network Features
5 Part 5 Reports and User Switches
6 Part 6 Maintenance and Troubleshooting
7 Installing Your FAX
8 A Look at the FAX-260E
9 Identifying the Documents You Send
10 Before Sending Documents
11 Sending Documents
12 Receiving Documents
13 Different Ways of Dialling
14 Using the Telephone with the FAX-260E
15 Sending at a Preset Time
16 Sending through a Relay Unit
17 Sending Confidential Documents
18 Polling (Requesting documents from other units)
19 Printing Reports and Registration Lists
20 Setting the Operating Guidelines
21 Caring for Your Fax
22 Error Messages and Codes
23 Troubleshooting
24 Specifications
25 Index
26 Error Messages and Codes
27 Troubleshooting
28 Index
29 Setting the Operating Guidelines
30 Sending Documents

TABLE 2

THE DUTCH CORPUS

1 Deel 1 Voordat u begint
2 Deel 2 Verzenden en ontvangen
3 Deel 3 De FAX-260E gebruiken als telefoonkiezer en copier
4 Deel 4 FAX-functies
5 Deel 5 Rapporten en gebruikersschakelaars
6 Deel 6 Onderhoud en problemen oplossen
7 Installatie van uw FAX-260E
8 De onderdelen van uw FAX-260E
9 Identificatie van uw verzonden documenten
10 Originelen
11 Verzenden
12 Ontvangen
13 Snel en eenvoudig kiezen
14 Gebruik van de FAX-260E als telefoonkiezer
15 Verzenden op ingesteld tijdstip
16 Verzenden via transit fax-apparaat
17 Vertrouweijk verzenden
18 Polling (op verzoek documenten van andere fax-apparaten ontvangen)
19 Afdrukken van rapporten en lijsten
20 Instellen van gebruikersschakelaars
21 Onderhoud
22 Foutmeldingen en codes
23 Problemen oplossen
24 Technische gegevens
25 Trefwoordenlijst
26 Foutmeldingen en codes
27 Problemen oplossen
28 Trefwoordenlijst
29 Vastleggen van gebruikersinstellingen
30 Problemen oplossen

TABLE 3

ENGLISH WORD FREQUENCIES

| | | |
|---|---|---|
| 8 | and | |
| 8 | documents | (TOTAL = 118) |
| 8 | the | |
| 7 | sending | |
| 6 | part | |
| 3 | a | |
| 3 | troubleshooting | |
| 3 | using | |
| 2 | at | |
| 2 | before | |
| 2 | codes | |
| 2 | error | |
| 2 | fax | |
| 2 | fax-260e | |
| 2 | features | |
| 2 | guidelines | |
| 2 | index | |
| 2 | messages | |
| 2 | operating | |
| 2 | receiving | |
| 2 | reports | |
| 2 | setting | |
| 2 | telephone | |
| 2 | your | |
| 1 | 1 | |
| 1 | 2 | |
| 1 | 3 | |
| 1 | 4 | |
| 1 | 5 | |
| 1 | 6 | |
| 1 | caring | |
| 1 | confidential | |
| 1 | copying | |
| 1 | dialling | |
| 1 | different | |
| 1 | for | |
| 1 | from | |
| 1 | identifying | |
| 1 | installing | |
| 1 | lists | |
| 1 | look | |
| 1 | maintenance | |
| 1 | memory | |
| 1 | network | |
| 1 | of | |
| 1 | other | |
| 1 | polling | |
| 1 | preset | |
| 1 | printing | |
| 1 | registration | |
| 1 | relay | |
| 1 | requesting | |
| 1 | send | |
| 1 | specifications | |
| 1 | starting | |
| 1 | switches | |
| 1 | through | |
| 1 | time | |
| 1 | unit | |
| 1 | units | |
| 1 | user | |
| 1 | ways | |
| 1 | with | |
| 1 | you | |

TABLE 4

DUTCH WORD FREQUENCIES

| | | |
|---|---|---|
| 8 | en | |
| 8 | van | |
| 6 | deel | (TOTAL = 106) |
| 5 | verzenden | |
| 4 | fax-260e | |

TABLE 4-continued
DUTCH WORD FREQUENCIES

| | |
|---|---|
| 4 | oplossen |
| 4 | problemen |
| 3 | de |
| 3 | ontvangen |
| 3 | uw |
| 2 | als |
| 2 | codes |
| 2 | documenten |
| 2 | foutmeldingen |
| 2 | gebruikersschakelaars |
| 2 | onderhoud |
| 2 | op |
| 2 | rapporten |
| 2 | telefoonkiezer |
| 2 | trefwoordenlijst |
| 1 | 1 |
| 1 | 2 |
| 1 | 3 |
| 1 | 4 |
| 1 | 5 |
| 1 | 6 |
| 1 | afdrukken |
| 1 | andere |
| 1 | begint |
| 1 | copier |
| 1 | eenvoudig |
| 1 | fax-apparaat |
| 1 | fax-apparaten |
| 1 | fax-functies |
| 1 | gebruik |
| 1 | gebruiken |
| 1 | gebruikersinstellingen |
| 1 | gegevens |
| 1 | identificatie |
| 1 | ingesteld |
| 1 | installatie |
| 1 | instellen |
| 1 | kiezen |
| 1 | lijsten |
| 1 | onderdelen |
| 1 | originelen |
| 1 | polling |
| 1 | snel |
| 1 | technische |
| 1 | tijdstip |
| 1 | transit |
| 1 | u |
| 1 | vastleggen |
| 1 | vertrouweijk |
| 1 | verzoek |
| 1 | verzonden |
| 1 | via |
| 1 | voordat |

TABLE 5
WORD PAIR FREQUENCIES

| | | |
|---|---|---|
| 7 | and en | |
| 6 | part deel | (TOTAL = 510) |
| 6 | the van | |
| 5 | and deel | |
| 5 | sending verzenden | |
| 4 | part en | |
| 4 | the de | |
| 4 | the fax-260e | |
| 3 | documents ontvangen | |
| 3 | documents verzenden | |
| 3 | the als | |
| 3 | the telefoonkiezer | |
| 3 | troubleshooting oplossen | |
| 3 | troubleshooting problemen | |
| 2 | a verzenden | |
| 2 | and codes | |

TABLE 5-continued
WORD PAIR FREQUENCIES

| | |
|---|---|
| 2 | and foutmeldingen |
| 2 | and rapporten |
| 2 | codes codes |
| 2 | codes en |
| 2 | codes foutmeldingen |
| 2 | documents documenten |
| 2 | documents van |
| 2 | error codes |
| 2 | error en |
| 2 | error foutmeldingen |
| 2 | fax-260e de |
| 2 | fax-260e fax-260e |
| 2 | fax-260e van |
| 2 | features deel |
| 2 | guidelines van |
| 2 | index trefwoordenlijst |
| 2 | messages codes |
| 2 | messages en |
| 2 | messages foutmeldingen |
| 2 | operating van |
| 2 | receiving ontvangen |
| 2 | reports en |
| 2 | reports rapporten |
| 2 | setting van |
| 2 | telephone als |
| 2 | telephone de |
| 2 | telephone fax-260e |
| 2 | telephone telefoonkiezer |
| 2 | the deel |
| 2 | the gebruik |
| 2 | the uw |
| 2 | using als |
| 2 | using de |
| 2 | using deel |
| 2 | using fax-260e |
| 2 | using telefoonkiezer |
| 1 | 1 1 |
| 1 | 1 begint |
| 1 | 1 deel |
| 1 | 1 u |
| 1 | 1 voordat |
| 1 | 2 2 |
| 1 | 2 deel |
| 1 | 2 en |
| 1 | 2 ontvangen |
| 1 | 2 verzenden |
| 1 | 3 3 |
| 1 | 3 als |
| 1 | 3 copier |
| 1 | 3 de |
| 1 | 3 deel |
| 1 | 3 en |
| 1 | 3 fax-260e |
| 1 | 3 gebruiken |
| 1 | 3 telefoonkiezer |
| 1 | 4 4 |
| 1 | 4 deel |
| 1 | 4 fax-functies |
| 1 | 5 5 |
| 1 | 5 deel |
| 1 | 5 en |
| 1 | 5 gebruikersschakelaars |
| 1 | 5 rapporten |
| 1 | 6 6 |
| 1 | 6 deel |
| 1 | 6 en |
| 1 | 6 onderhoud |
| 1 | 6 oplossen |
| 1 | 6 problemen |
| 1 | a de |
| 1 | a fax-260e |
| 1 | a fax-apparaat |
| 1 | a ingesteld |
| 1 | a onderdelen |
| 1 | a op |
| 1 | a tijdstip |
| 1 | a transit |

TABLE 5-continued

WORD PAIR FREQUENCIES

| | |
|---|---|
| 1 | a uw |
| 1 | a van |
| 1 | a via |
| 1 | and 2 |
| 1 | and 3 |
| 1 | and 4 |
| 1 | and 5 |
| 1 | and 6 |
| 1 | and afdrukken |
| 1 | and als |
| 1 | and copier |
| 1 | and de |
| 1 | and fax-260e |
| 1 | and fax-functies |
| 1 | and gebruiken |
| 1 | and gebruikersschakelaars |
| 1 | and lijsten |
| 1 | and onderhoud |
| 1 | and ontvangen |
| 1 | and oplossen |
| 1 | and problemen |
| 1 | and telefoonkiezer |
| 1 | and van |
| 1 | and verzenden |
| 1 | at de |
| 1 | at fax-260e |
| 1 | at ingesteld |
| 1 | at onderdelen |
| 1 | at op |
| 1 | at tijdstip |
| 1 | at uw |
| 1 | at van |
| 1 | at verzenden |
| 1 | before 1 |
| 1 | before begint |
| 1 | before deel |
| 1 | before originelen |
| 1 | before u |
| 1 | before voordat |
| 1 | caring onderhoud |
| 1 | confidential vertrouweijk |
| 1 | confidential verzenden |
| 1 | copying 3 |
| 1 | copying als |
| 1 | copying copier |
| 1 | copying de |
| 1 | copying deel |
| 1 | copying en |
| 1 | copying fax-260e |
| 1 | copying gebruiken |
| 1 | copying telefoonkiezer |
| 1 | dialling eenvoudig |
| 1 | dialling en |
| 1 | dialling kiezen |
| 1 | dialling snel |
| 1 | different eenvoudig |
| 1 | different en |
| 1 | different kiezen |
| 1 | different snel |
| 1 | documents 2 |
| 1 | documents andere |
| 1 | documents deel |
| 1 | documents en |
| 1 | documents fax-apparaten |
| 1 | documents identificatie |
| 1 | documents op |
| 1 | documents oplossen |
| 1 | documents originelen |
| 1 | documents polling |
| 1 | documents problemen |
| 1 | documents uw |
| 1 | documents vertrouweijk |
| 1 | documents verzoek |
| 1 | documents verzonden |
| 1 | fax fax-260e |
| 1 | fax installatie |
| 1 | fax onderhoud |

TABLE 5-continued

WORD PAIR FREQUENCIES

| | |
|---|---|
| 1 | fax uw |
| 1 | fax van |
| 1 | fax-260e als |
| 1 | fax-260e gebruik |
| 1 | fax-260e onderdelen |
| 1 | fax-260e telefoonkiezer |
| 1 | fax-260e uw |
| 1 | features 3 |
| 1 | features 4 |
| 1 | features als |
| 1 | features copier |
| 1 | features de |
| 1 | features en |
| 1 | features fax-260e |
| 1 | features fax-functies |
| 1 | features gebruiken |
| 1 | features telefoonkiezer |
| 1 | for onderhoud |
| 1 | from andere |
| 1 | from documenten |
| 1 | from fax-apparaten |
| 1 | from ontvangen |
| 1 | from op |
| 1 | from polling |
| 1 | from van |
| 1 | from verzoek |
| 1 | guidelines gebruikersinstellingen |
| 1 | guidelines gebruikersschakelaars |
| 1 | guidelines instellen |
| 1 | guidelines vastleggen |
| 1 | identifying documenten |
| 1 | identifying identificatie |
| 1 | identifying uw |
| 1 | identifying van |
| 1 | identifying verzonden |
| 1 | installing fax-260e |
| 1 | installing installatie |
| 1 | installing uw |
| 1 | installing van |
| 1 | lists afdrukken |
| 1 | lists en |
| 1 | lists lijsten |
| 1 | lists rapporten |
| 1 | lists van |
| 1 | look de |
| 1 | look fax-260e |
| 1 | look onderdelen |
| 1 | look uw |
| 1 | look van |
| 1 | maintenance 6 |
| 1 | maintenance deel |
| 1 | maintenance en |
| 1 | maintenance onderhoud |
| 1 | maintenance oplossen |
| 1 | maintenance problemen |
| 1 | memory 4 |
| 1 | memory deel |
| 1 | memory fax-functies |
| 1 | network 4 |
| 1 | network deel |
| 1 | network fax-functies |
| 1 | of eenvoudig |
| 1 | of en |
| 1 | of kiezen |
| 1 | of snel |
| 1 | operating gebruikersinstellingen |
| 1 | operating gebruikersschakelaars |
| 1 | operating instellen |
| 1 | operating vastleggen |
| 1 | other andere |
| 1 | other documenten |
| 1 | other fax-apparaten |
| 1 | other ontvangen |
| 1 | other op |
| 1 | other polling |
| 1 | other van |
| 1 | other verzoek |

TABLE 5-continued

WORD PAIR FREQUENCIES

| | | |
|---|---|---|
| 1 | part 1 | |
| 1 | part 2 | |
| 1 | part 3 | |
| 1 | part 4 | |
| 1 | part 5 | |
| 1 | part 6 | |
| 1 | part als | |
| 1 | part begint | |
| 1 | part copier | |
| 1 | part de | |
| 1 | part fax-260e | |
| 1 | part fax-functies | |
| 1 | part gebruiken | |
| 1 | part gebruikersschakelaars | |
| 1 | part onderhoud | |
| 1 | part ontvangen | |
| 1 | part oplossen | |
| 1 | part problemen | |
| 1 | part rapporten | |
| 1 | part telefoonkiezer | |
| 1 | part u | |
| 1 | part verzenden | |
| 1 | part voordat | |
| 1 | polling andere | |
| 1 | polling documenten | |
| 1 | polling fax-apparaten | |
| 1 | polling ontvangen | |
| 1 | polling op | |
| 1 | polling polling | |
| 1 | polling van | |
| 1 | polling verzoek | |
| 1 | preset ingesteld | |
| 1 | preset op | |
| 1 | preset tijdstip | |
| 1 | preset verzenden | |
| 1 | printing afdrukken | |
| 1 | printing en | |
| 1 | printing lijsten | |
| 1 | printing rapporten | |
| 1 | printing van | |
| 1 | receiving 2 | |
| 1 | receiving deel | |
| 1 | receiving en | |
| 1 | receiving verzenden | |
| 1 | registration afdrukken | |
| 1 | registration en | |
| 1 | registration lijsten | |
| 1 | registration rapporten | |
| 1 | registration van | |
| 1 | relay fax-apparaat | |
| 1 | relay transit | |
| 1 | relay verzenden | |
| 1 | relay via | |
| 1 | reports 5 | |
| 1 | reports afdrukken | |
| 1 | reports deel | |
| 1 | reports gebruikersschakelaars | |
| 1 | reports lijsten | |
| 1 | reports van | |
| 1 | requesting andere | |
| 1 | requesting documenten | |
| 1 | requesting fax-apparaten | |
| 1 | requesting ontvangen | |
| 1 | requesting op | |
| 1 | requesting polling | |
| 1 | requesting van | |
| 1 | requesting verzoek | |
| 1 | send documenten | |
| 1 | send identificatie | |
| 1 | send uw | |
| 1 | send van | |
| 1 | send verzonden | |
| 1 | sending 2 | |
| 1 | sending deel | |
| 1 | sending en | |
| 1 | sending fax-apparaat | |
| 1 | sending ingesteld | |

TABLE 5-continued

WORD PAIR FREQUENCIES

| | | |
|---|---|---|
| 1 | sending ontvangen | |
| 1 | sending op | |
| 1 | sending oplossen | |
| 1 | sending originelen | |
| 1 | sending problemen | |
| 1 | sending tijdstip | |
| 1 | sending transit | |
| 1 | sending vertrouweijk | |
| 1 | sending via | |
| 1 | setting gebruikersinstellingen | |
| 1 | setting gebruikersschakelaars | |
| 1 | setting instellen | |
| 1 | setting vastleggen | |
| 1 | specifications gegevens | |
| 1 | specifications technische | |
| 1 | starting 1 | |
| 1 | starting begint | |
| 1 | starting deel | |
| 1 | starting u | |
| 1 | starting voordat | |
| 1 | switches 5 | |
| 1 | switches deel | |
| 1 | switches en | |
| 1 | switches gebruikersschakelaars | |
| 1 | switches rapporten | |
| 1 | telephone 3 | |
| 1 | telephone copier | |
| 1 | telephone deel | |
| 1 | telephone en | |
| 1 | telephone gebruik | |
| 1 | telephone gebruiken | |
| 1 | telephone van | |
| 1 | the 3 | |
| 1 | the 4 | |
| 1 | the copier | |
| 1 | the documenten | |
| 1 | the en | |
| 1 | the fax-functies | |
| 1 | the gebruiken | |
| 1 | the gebruikersinstellingen | |
| 1 | the gebruikersschakelaars | |
| 1 | the identificatie | |
| 1 | the instellen | |
| 1 | the onderdelen | |
| 1 | the vastleggen | |
| 1 | the verzonden | |
| 1 | through fax-apparaat | |
| 1 | through transit | |
| 1 | through verzenden | |
| 1 | through via | |
| 1 | time ingesteld | |
| 1 | time op | |
| 1 | time tijdstip | |
| 1 | time verzenden | |
| 1 | troubleshooting 6 | |
| 1 | troubleshooting deel | |
| 1 | troubleshooting en | |
| 1 | troubleshooting onderhoud | |
| 1 | unit fax-apparaat | |
| 1 | unit transit | |
| 1 | unit verzenden | |
| 1 | unit via | |
| 1 | units andere | |
| 1 | units documenten | |
| 1 | units fax-apparaten | |
| 1 | units ontvangen | |
| 1 | units op | |
| 1 | units polling | |
| 1 | units van | |
| 1 | units verzoek | |
| 1 | user 5 | |
| 1 | user deel | |
| 1 | user en | |
| 1 | user gebruikersschakelaars | |
| 1 | user rapporten | |
| 1 | using 3 | |
| 1 | using 4 | |

TABLE 5-continued

WORD PAIR FREQUENCIES

| | | |
|---|---|---|
| 1 | using copier | |
| 1 | using en | |
| 1 | using fax-functies | |
| 1 | using gebruik | |
| 1 | using gebruiken | |
| 1 | using van | |
| 1 | ways eenvoudig | |
| 1 | ways en | |
| 1 | ways kiezen | |
| 1 | ways snel | |
| 1 | with als | |
| 1 | with de | |
| 1 | with fax-260e | |
| 1 | with gebruik | |
| 1 | with telefoonkiezer | |
| 1 | with van | |
| 1 | you documenten | |
| 1 | you identificatie | |
| 1 | you uw | |
| 1 | you van | |
| 1 | you verzonden | |
| 1 | your fax-260e | |
| 1 | your installatie | |
| 1 | your onderhoud | |
| 1 | your uw | |
| 1 | your van | |

TABLE 6

WORD PAIR CORRELATION SCORES

| | |
|---|---|
| 24.525490 | 1 1 |
| 24.525490 | 1 begint |
| 24.525490 | 1 u |
| 24.525490 | 1 voordat |
| 24.525490 | 2 2 |
| 24.525490 | 3 3 |
| 24.525490 | 3 copier |
| 24.525490 | 3 gebruiken |
| 24.525490 | 4 4 |
| 24.525490 | 4 fax-functies |
| 24.525490 | 5 5 |
| 24.525490 | 6 6 |
| 24.525490 | confidential vertrouweijk |
| 24.525490 | copying 3 |
| 24.525490 | copying copier |
| 24.525490 | copying gebruiken |
| 24.525490 | dialling eenvoudig |
| 24.525490 | dialling kiezen |
| 24.525490 | dialling snel |
| 24.525490 | different eenvoudig |
| 24.525490 | different kiezen |
| 24.525490 | different snel |
| 24.525490 | from andere |
| 24.525490 | from fax-apparaten |
| 24.525490 | from polling |
| 24.525490 | from verzoek |
| 24.525490 | identifying identificatie |
| 24.525490 | identifying verzonden |
| 24.525490 | installing installatie |
| 24.525490 | lists afdrukken |
| 24.525490 | lists lijsten |
| 24.525490 | look onderdelen |
| 24.525490 | maintenance 6 |
| 24.525490 | memory 4 |
| 24.525490 | memory fax-functies |
| 24.525490 | network 4 |
| 24.525490 | network fax-functies |
| 24.525490 | of eenvoudig |
| 24.525490 | of kiezen |
| 24.525490 | of snel |
| 24.525490 | other andere |
| 24.525490 | other fax-apparaten |
| 24.525490 | other polling |

TABLE 6-continued

WORD PAIR CORRELATION SCORES

| | |
|---|---|
| 24.525490 | other verzoek |
| 24.525490 | polling andere |
| 24.525490 | polling fax-apparaten |
| 24.525490 | polling polling |
| 24.525490 | polling verzoek |
| 24.525490 | preset ingesteld |
| 24.525490 | preset tijdstip |
| 24.525490 | printing afdrukken |
| 24.525490 | printing lijsten |
| 24.525490 | registration afdrukken |
| 24.525490 | registration lijsten |
| 24.525490 | relay fax-apparaat |
| 24.525490 | relay transit |
| 24.525490 | relay via |
| 24.525490 | requesting andere |
| 24.525490 | requesting fax-apparaten |
| 24.525490 | requesting polling |
| 24.525490 | requesting verzoek |
| 24.525490 | send identificatie |
| 24.525490 | send verzonden |
| 24.525490 | specifications gegevens |
| 24.525490 | specifications technische |
| 24.525490 | starting 1 |
| 24.525490 | starting begint |
| 24.525490 | starting u |
| 24.525490 | starting voordat |
| 24.525490 | switches 5 |
| 24.525490 | through fax-apparaat |
| 24.525490 | through transit |
| 24.525490 | through via |
| 24.525490 | time ingesteld |
| 24.525490 | time tijdstip |
| 24.525490 | unit fax-apparaat |
| 24.525490 | unit transit |
| 24.525490 | unit via |
| 24.525490 | units andere |
| 24.525490 | units fax-apparaten |
| 24.525490 | units polling |
| 24.525490 | units verzoek |
| 24.525490 | user 5 |
| 24.525490 | ways eenvoudig |
| 24.525490 | ways kiezen |
| 24.525490 | ways snel |
| 24.525490 | with gebruik |
| 24.525490 | you identificatie |
| 24.525490 | you verzonden |
| 12.262745 | 3 als |
| 12.262745 | 3 telefoonkiezer |
| 12.262745 | 5 gebruikersschakelaars |
| 12.262745 | 5 rapporten |
| 12.262745 | 6 onderhoud |
| 12.262745 | at ingesteld |
| 12.262745 | at onderdelen |
| 12.262745 | at tijdstip |
| 12.262745 | before 1 |
| 12.262745 | before begint |
| 12.262745 | before originelen |
| 12.262745 | before u |
| 12.262745 | before voordat |
| 12.262745 | caring onderhoud |
| 12.262745 | codes codes |
| 12.262745 | codes foutmeldingen |
| 12.262745 | copying als |
| 12.262745 | copying telefoonkiezer |
| 12.262745 | error codes |
| 12.262745 | error foutmeldingen |
| 12.262745 | fax installatie |
| 12.262745 | fax-260e gebruik |
| 12.262745 | fax-260e onderdelen |
| 12.262745 | features 3 |
| 12.262745 | features 4 |
| 12.262745 | features copier |
| 12.262745 | features fax-functies |
| 12.262745 | features gebruiken |
| 12.262745 | for onderhoud |
| 12.262745 | from documenten |
| 12.262745 | from op |

TABLE 6-continued

WORD PAIR CORRELATION SCORES

| | |
|---|---|
| 12.262745 | guidelines gebruikersinstellingen |
| 12.262745 | guidelines instellen |
| 12.262745 | guidelines vastleggen |
| 12.262745 | identifying documenten |
| 12.262745 | index trefwoordenlijst |
| 12.262745 | lists rapporten |
| 12.262745 | maintenance onderhoud |
| 12.262745 | messages codes |
| 12.262745 | messages foutmeldingen |
| 12.262745 | operating gebruikersinstellingen |
| 12.262745 | operating instellen |
| 12.262745 | operating vastleggen |
| 12.262745 | other documenten |
| 12.262745 | other op |
| 12.262745 | polling documenten |
| 12.262745 | polling op |
| 12.262745 | preset op |
| 12.262745 | printing rapporten |
| 12.262745 | receiving 2 |
| 12.262745 | registration rapporten |
| 12.262745 | reports 5 |
| 12.262745 | reports afdrukken |
| 12.262745 | reports lijsten |
| 12.262745 | reports rapporten |
| 12.262745 | requesting documenten |
| 12.262745 | requesting op |
| 12.262745 | send documenten |
| 12.262745 | setting gebruikersinstellingen |
| 12.262745 | setting instellen |
| 12.262745 | setting vastleggen |
| 12.262745 | switches gebruikersschakelaars |
| 12.262745 | switches rapporten |
| 12.262745 | telephone 3 |
| 12.262745 | telephone als |
| 12.262745 | telephone copier |
| 12.262745 | telephone gebruik |
| 12.262745 | telephone gebruiken |
| 12.262745 | telephone telefoonkiezer |
| 12.262745 | time op |
| 12.262745 | units documenten |
| 12.262745 | units op |
| 12.262745 | user gebruikersschakelaars |
| 12.262745 | user rapporten |
| 12.262745 | with als |
| 12.262745 | with telefoonkiezer |
| 12.262745 | you documenten |
| 12.262745 | your installatie |
| 8.175163 | 2 ontvangen |
| 8.175163 | 3 de |
| 8.175163 | a fax-apparaat |
| 8.175163 | a ingesteld |
| 8.175163 | a onderdelen |
| 8.175163 | a tijdstip |
| 8.175163 | a transit |
| 8.175163 | a via |
| 8.175163 | copying de |
| 8.175163 | fax-260e de |
| 8.175163 | from ontvangen |
| 8.175163 | identifying uw |
| 8.175163 | installing uw |
| 8.175163 | look de |
| 8.175163 | look uw |
| 8.175163 | other ontvangen |
| 8.175163 | polling ontvangen |
| 8.175163 | receiving ontvangen |
| 8.175163 | requesting ontvangen |
| 8.175163 | send uw |
| 8.175163 | telephone de |
| 8.175163 | troubleshooting 6 |
| 8.175163 | units ontvangen |
| 8.175163 | using 3 |
| 8.175163 | using 4 |
| 8.175163 | using als |
| 8.175163 | using copier |
| 8.175163 | using fax-functies |
| 8.175163 | using gebruik |
| 8.175163 | using gebruiken |
| 8.175163 | using telefoonkiezer |
| 8.175163 | with de |
| 8.175163 | you uw |
| 6.131373 | 3 fax-260e |
| 6.131373 | 6 oplossen |
| 6.131373 | 6 problemen |
| 6.131373 | at op |
| 6.131373 | copying fax-260e |
| 6.131373 | fax onderhoud |
| 6.131373 | fax-260e als |
| 6.131373 | fax-260e fax-260e |
| 6.131373 | fax-260e telefoonkiezer |
| 6.131373 | features als |
| 6.131373 | features telefoonkiezer |
| 6.131373 | guidelines gebruikersschakelaars |
| 6.131373 | installing fax-260e |
| 6.131373 | look fax-260e |
| 6.131373 | maintenance oplossen |
| 6.131373 | maintenance problemen |
| 6.131373 | operating gebruikersschakelaars |
| 6.131373 | reports gebruikersschakelaars |
| 6.131373 | setting gebruikersschakelaars |
| 6.131373 | telephone fax-260e |
| 6.131373 | the gebruik |
| 6.131373 | troubleshooting oplossen |
| 6.131373 | troubleshooting problemen |
| 6.131373 | with fax-260e |
| 6.131373 | your onderhoud |
| 5.450109 | using de |
| 4.905098 | 2 verzenden |
| 4.905098 | confidential verzenden |
| 4.905098 | preset verzenden |
| 4.905098 | relay verzenden |
| 4.905098 | through verzenden |
| 4.905098 | time verzenden |
| 4.905098 | unit verzenden |
| 4.598529 | the als |
| 4.598529 | the telefoonkiezer |
| 4.087582 | 1 deel |
| 4.087582 | 2 deel |
| 4.087582 | 3 deel |
| 4.087582 | 4 deel |
| 4.087582 | 5 deel |
| 4.087582 | 6 deel |
| 4.087582 | a op |
| 4.087582 | at de |
| 4.087582 | at uw |
| 4.087582 | copying deel |
| 4.087582 | fax uw |
| 4.087582 | fax-260e uw |
| 4.087582 | features de |
| 4.087582 | features deel |
| 4.087582 | maintenance deel |
| 4.087582 | memory deel |
| 4.087582 | network deel |
| 4.087582 | part 1 |
| 4.087582 | part 2 |
| 4.087582 | part 3 |
| 4.087582 | part 4 |
| 4.087582 | part 5 |
| 4.087582 | part 6 |
| 4.087582 | part begint |
| 4.087582 | part copier |
| 4.087582 | part deel |
| 4.087582 | part fax-functies |
| 4.087582 | part gebruiken |
| 4.087582 | part u |
| 4.087582 | part voordat |
| 4.087582 | starting deel |
| 4.087582 | switches deel |
| 4.087582 | the de |
| 4.087582 | troubleshooting onderhoud |
| 4.087582 | user deel |
| 4.087582 | using fax-260e |
| 4.087582 | your uw |
| 3.503641 | sending 2 |
| 3.503641 | sending fax-apparaat |

TABLE 6-continued

WORD PAIR CORRELATION SCORES

| | |
|---|---|
| 3.503641 | sending ingesteld |
| 3.503641 | sending originelen |
| 3.503641 | sending tijdstip |
| 3.503641 | sending transit |
| 3.503641 | sending vertrouweijk |
| 3.503641 | sending verzenden |
| 3.503641 | sending via |
| 3.270065 | a verzenden |
| 3.065686 | 2 en |
| 3.065686 | 3 en |
| 3.065686 | 5 en |
| 3.065686 | 6 en |
| 3.065686 | and 2 |
| 3.065686 | and 3 |
| 3.065686 | and 4 |
| 3.065686 | and 5 |
| 3.065686 | and 6 |
| 3.065686 | and afdrukken |
| 3.065686 | and codes |
| 3.065686 | and copier |
| 3.065686 | and fax-functies |
| 3.065686 | and foutmeldingen |
| 3.065686 | and gebruiken |
| 3.065686 | and lijsten |
| 3.065686 | and rapporten |
| 3.065686 | at fax-260e |
| 3.065686 | codes en |
| 3.065686 | copying en |
| 3.065686 | dialling en |
| 3.065686 | different en |
| 3.065686 | documents 2 |
| 3.065686 | documents andere |
| 3.065686 | documents documenten |
| 3.065686 | documents fax-apparaten |
| 3.065686 | documents identificatie |
| 3.065686 | documents ontvangen |
| 3.065686 | documents originelen |
| 3.065686 | documents polling |
| 3.065686 | documents vertrouweijk |
| 3.065686 | documents verzoek |
| 3.065686 | documents verzonden |
| 3.065686 | error en |
| 3.065686 | fax fax-260e |
| 3.065686 | fax-260e van |
| 3.065686 | features fax-260e |
| 3.065686 | from van |
| 3.065686 | guidelines van |
| 3.065686 | identifying van |
| 3.065686 | installing van |
| 3.065686 | lists en |
| 3.065686 | lists van |
| 3.065686 | look van |
| 3.065686 | maintenance en |
| 3.065686 | messages en |
| 3.065686 | of en |
| 3.065686 | operating van |
| 3.065686 | other van |
| 3.065686 | polling van |
| 3.065686 | printing en |
| 3.065686 | printing van |
| 3.065686 | registration en |
| 3.065686 | registration van |
| 3.065686 | reports en |
| 3.065686 | requesting van |
| 3.065686 | send van |
| 3.065686 | setting van |
| 3.065686 | switches en |
| 3.065686 | the 3 |
| 3.065686 | the 4 |
| 3.065686 | the copier |
| 3.065686 | the fax-260e |
| 3.065686 | the fax-functies |
| 3.065686 | the gebruiken |
| 3.065686 | the gebruikersinstellingen |
| 3.065686 | the identificatie |
| 3.065686 | the instellen |
| 3.065686 | the onderdelen |
| 3.065686 | the vastleggen |
| 3.065686 | the verzonden |
| 3.065686 | units van |
| 3.065686 | user en |
| 3.065686 | ways en |
| 3.065686 | with van |
| 3.065686 | you van |
| 3.065686 | your fax-260e |
| 2.725054 | a de |
| 2.725054 | a uw |
| 2.725054 | using deel |
| 2.682475 | and en |
| 2.554739 | and deel |
| 2.452549 | at verzenden |
| 2.452549 | receiving verzenden |
| 2.299265 | the van |
| 2.043791 | a fax-260e |
| 2.043791 | before deel |
| 2.043791 | part als |
| 2.043791 | part en |
| 2.043791 | part gebruikersschakelaars |
| 2.043791 | part onderhoud |
| 2.043791 | part rapporten |
| 2.043791 | part telefoonkiezer |
| 2.043791 | receiving deel |
| 2.043791 | reports deel |
| 2.043791 | telephone deel |
| 2.043791 | the uw |
| 1.839412 | documents verzenden |
| 1.751821 | sending op |
| 1.532843 | and als |
| 1.532843 | and gebruikersschakelaars |
| 1.532843 | and onderhoud |
| 1.532843 | and telefoonkiezer |
| 1.532843 | at van |
| 1.532843 | documents op |
| 1.532843 | fax van |
| 1.532843 | features en |
| 1.532843 | receiving en |
| 1.532843 | reports van |
| 1.532843 | telephone en |
| 1.532843 | telephone van |
| 1.532843 | the documenten |
| 1.532843 | the gebruikersschakelaars |
| 1.532843 | your van |
| 1.362527 | part de |
| 1.362527 | part ontvangen |
| 1.362527 | troubleshooting deel |
| 1.167880 | sending ontvangen |
| 1.021895 | a van |
| 1.021895 | and de |
| 1.021895 | and ontvangen |
| 1.021895 | documents uw |
| 1.021895 | part fax-260e |
| 1.021895 | part oplossen |
| 1.021895 | part problemen |
| 1.021895 | the deel |
| 1.021895 | troubleshooting en |
| 1.021895 | using en |
| 1.021895 | using van |
| 0.875910 | sending oplossen |
| 0.875910 | sending problemen |
| 0.817516 | part verzenden |
| 0.766422 | and fax-260e |
| 0.766422 | and oplossen |
| 0.766422 | and problemen |
| 0.766422 | documents oplossen |
| 0.766422 | documents problemen |
| 0.766422 | documents van |
| 0.613137 | and verzenden |
| 0.583940 | sending deel |
| 0.510948 | documents deel |
| 0.437955 | sending en |
| 0.383211 | and van |
| 0.383211 | documents en |
| 0.383211 | the en |

TABLE 7

SCORES FOR ALIGNED CHUNKS

Part 1 Before Starting
Deel 1 Voordat u begint
score = 10.071629
Part 2 Sending and Receiving Documents
Deel 2 Verzenden en ontvangen
score = 2.285732
Part 3 Using the Telephone and Copying Features
Deel 3 De FAX-260E gebruiken als telefoonkiezer en copier
score = 4.727727
Part 4 Using the Memory and Network Features
Deel 4 FAX-functies
score = 6.443163
Part 5 Reports and User Switches
Deel 5 Rapporten en gebruikersschakelaars
score = 5.372271
Part 6 Maintenance and Troubleshooting
Deel 6 Onderhoud en problemen oplossen
score = 3.598853
Installing your FAX
Installatie van uw FAX-260E
score = 4.935864
A Look at the FAX-260E
De onderdelen van uw FAX-260E
score = 4.253443
Identifying the Documents You Send
Identificatie van uw verzonden documenten
score = 5.746231
Before Sending Documents
Originelen
score = 5.087975
Sending Documents
Verzenden
score = 2.538629
Receiving Documents
Ontvangen
score = 5.006244
Different Ways of Dialling
Snel en eenvoudig kiezen
score = 14.582943
Using the Telephone with the FAX-260E
Gebruik van de FAX-260E als telefoonkiezer
score = 5.621435
Sending at a Preset Time
Verzenden op ingesteld tijdstip
score = 7.327703
Sending through a Relay Unit
Verzenden via transit fax-apparaat
score = 10.009936

TABLE 8

Sending Confidential Documents
Vertrouweijk verzenden
score = 4.502135
Polling (Requesting documents from other units)
Polling (op verzoek documenten van andere fax-apparaten ontvangen)
score = 10.322900
Printing Reports and Registration Lists
Afdrukken van rapporten en lijsten
score = 6.270169
Setting the Operating Guidelines
Instellen van gebruikersschakelaars
score = 4.751194
Caring for Your Fax
Onderhoud
score = 8.671070
Error Messages and Codes
Foutmeldingen en codes
score = 6.063523
Troubleshooting
Problemen oplossen
score = 6.131373
Specifications
Technische gegevens

TABLE 8-continued score = 24.525490
Index
Trefwoordenlijst
score = 12.262745
Error Messages and Codes
Foutmeldingen en codes
score = 6.063523
Troubleshooting
Problemen oplossen
score = 6.131373
Index
Trefwoordenlijst
score = 12.262745
Setting the Operating Guidelines
Vastleggen van gebruikersinstellingen
score = 5.986130
Sending Documents
Problemen oplossen
score = 0.819339

I claim:

1. A method of operating a processing apparatus for processing a bilingual database, the method comprising the steps:

storing in the apparatus a database comprising a first and second aligned corpora, each corpus being divided into portions such that at least a subset of the portions of the first corpus are identified by a correspondence relation with respective portions of the second corpus, at least some portions being further divided into plural elementary parts hereinafter referred to as words; and analyzing the aligned corpora to obtain a statistical database;

evaluating, using the statistical database, a correlation measure for portions in correspondence relationship chosen from the aligned corpora;

identifying from the correlation measures of portions in correspondence relationship instances of improbable alignment of the first and second corpora; and modifying the aligned corpora to remove at least the most improbable corpora alignments.

2. A method as claimed in claim 1, further comprising updating the statistical database in accordance with the modification of the aligned corpora.

3. A method of processing a bilingual database, the method comprising:

modifying the aligned corpora by a method according to claim 2, and repeating the method at least once to modify again the modified corpora using the updated statistical database.

4. A method as claimed in claim 1, wherein the modifying step includes interaction with a human translator to verify that the identified improbable corpora alignments are incorrect.

5. A method as claimed in claim 1, further comprising receiving further pairs of portions of text in correspondence relation and augmenting the aligned corpora and statistical database to include the received portions.

6. A method as claimed in claim 5, wherein said correlation measure is evaluated for each further pair of portions, and the aligned corpora are augmented conditionally, depending on the result of said evaluation.

7. A method as claimed in claim 1, wherein said evaluating step comprises:

deriving, using the statistical database, a measure of observed correlation for a pair of words chosen one from each corpus; and evaluating said measure of correlation of the portions by combining the derived correlation measures of word pairs contained in the pair of portions.

8. A method as claimed in claim 7 wherein said word pair correlation measure is derived from the frequency of occurrence of each word pair in aligned portions relative to the frequency of occurrence of the words of the pair in their respective corpora generally, independently of the frequency of occurrence of other word pairs.

9. A method as claimed in claim 7, wherein the combining of word pair correlation measures is performed irrespective of the positions of the words of a pair within their respective portions.

10. A method as claimed in claim 7, wherein the combining of word pair correlation measures is restricted to pairs of words which occur at approximately corresponding positions in their respective text portions.

11. A method as claimed in claim 7, wherein for the combining of word pair correlation measures certain common words are identified and ignored.

12. A method as claimed in claim 7, wherein the step of deriving word pair correlation measures includes:

deriving for each word of a pair a measure of the observed probability of finding that word in its respective corpus;

deriving for each chosen pair of words a measure of the observed probability of finding that pair of words in portions of the corpora in correspondence relationship; and combining the pair probability with the individual word probabilities to derive the measure of correlation between the words of the pair.

13. A method as claimed in claim 1 wherein the statistical database comprises:

for each corpus a table of word frequencies;

for the aligned corpora as a whole a table of word pair frequencies, counting the number of times a given pair of words (one from each corpus) occurs in portions of the corpora in correspondence relationship.

14. A method as claimed in claim 13 wherein said word pair frequencies are counted for all word pairs of each pair of text portions, irrespective of the word positions within each portion.

15. A method as claimed in claim 13, wherein the counting of word pairs is restricted to pairs of words which occur at approximately corresponding positions in their respective portions of the corpora.

16. A method as claimed in claim 13, wherein for the counting of word pairs certain common words are identified and ignored.

17. A method of operating a processing apparatus to automate translation of a source text from a source language to a target language, the method comprising:

storing in the apparatus a bilingual database including aligned corpora in the source and target languages;

modifying the aligned corpora by a method according to any of claims 1, 7, 8, or 12;

partitioning the source text into portions;

searching the aligned corpus of the source language for portions to match the source text portions; and (i) for source text portions where a match is found, outputting the corresponding portion of the target language corpus as a translation for inclusion in an output text; and (ii) for portions where no match is found, outputting a query message indicating that a translation has not been made.

18. A method as claimed in claim 17, wherein the outputting includes concatenating the translated portions and query messages (if any) and outputting the concatenated translated portions and query messages together as part of a single output text, for finalization by other means.

19. A storage device comprising a storage unit for storing a bilingual database modified by a processing apparatus operating as claimed in claim 1.

20. An automated translation system comprising a storage unit for storing a database modified by an apparatus operating according to claim 1 to automatically translate text information.

21. A method of operating a processing apparatus for processing a bilingual database, the method comprising the steps:

storing in the apparatus a database comprising first and second aligned corpora, each corpus being divided into portions such that at least a subset of the portions of the first corpus are identified by a correspondence relation with respective portions of the second corpus, at least some portions being further divided into one or more elementary parts hereinafter referred to as words ;

analyzing the aligned corpora to obtain a statistical database;

using the statistical database to derive a measure of observed correlation for a plurality of pairs of words, each of the pairs of words chosen one from each corpus;

receiving a further pair of text portions, one in each of two natural languages;

evaluating, for the further pair of text portions a measure of correlation of the portions, by combining the derived correlation measures of word pairs contained in the pair of text portions; and outputting an indication of the likelihood that the further pair of text portions are translations of one another based on the evaluated measure of correlation.

22. A method as claimed in claim 21, wherein said word pair correlation measures are derived from the frequency of occurrence of each word pair in aligned portions relative to the frequency of occurrence of the words of the pair in their respective corpora generally, independently of the frequency of occurrence of other word pairs.

23. A method as claimed in claim 21, wherein the combining of word pair correlation measures is performed irrespective of the positions of the words of a pair within their respective portions.

24. A method as claimed in claim 21, wherein the combining of word pair correlation measures is restricted to pairs of words which occur at approximately corresponding positions in their respective text portions.

25. A method as claimed in claim 21, wherein for the combining of word pair correlation measures certain common words are identified and ignored.

26. A method as claimed in claim 21, wherein the step of deriving word pair correlation measures includes:

deriving for each word of a pair a measure of the observed probability of finding that word in its respective corpus;

deriving for each chosen pair of words a measure of the observed probability of finding that pair of words in aligned portions of the corpora; and combining the pair probability with the individual word probabilities to derive said measure of correlation between the words of the pair.

27. A method as claimed in claim 21, wherein the statistical database comprises:

for each corpus a table of word frequencies;

for the aligned corpora as a whole, a table of word pair frequencies, counting the number of times a given pair of words (one from each corpus) occurs in aligned portions of the corpora.

28. A method as claimed in claim 27, wherein said word pair frequencies are counted for all word pairs of each pair of text portions, irrespective of the word positions within each portion.

29. A method as claimed in claim 27, wherein the counting of word pairs is restricted to pairs of words which occur at approximately corresponding positions in their respective aligned portions of the corpora.

30. A method as claimed in claim 27, wherein for the counting of word pairs certain common words are identified and ignored.

31. A method of operating a processing apparatus to automate translation of a source text from a source language to a target language, the method comprising:

storing in the apparatus bilingual database comprising aligned corpora in the source and target languages;

partitioning the source text into portions;

obtaining a candidate translation of each source text portion in the form of a candidate target language portion; and verifying the translation by evaluating a correlation measure for the source language portion and candidate target language portion by a method according to claim 21, 22 or 26;

outputting verified candidate portions for inclusion in a target text.

32. A method as claimed in claim 31, wherein the verifying step includes applying a threshold to the correlation measure of a candidate portion.

33. A method as claimed in claim 31, further including the step of outputting a query message indicating that a verified translation has not been made for the source language portion.

34. A computer usable medium having computer readable program code means for causing a computer to process a bilingual database, the medium comprising:

first means for causing the computer to store a database comprising a first and second aligned corpora, each corpus being divided into portions such that at least a subset of the portions of the first corpus are identified by a correspondence relation with respective portions of the second corpus, at least some portions being further divided into plural elementary parts;

second means for causing the computer to analyze the aligned corpora to obtain a statistical database;

third means for causing the computer to evaluate, using the statistical database, a correlation measure for portions in correspondence relationship chosen from the aligned corpora;

fourth means for causing the computer to identify from the correlation measures of portions in correspondence relationship instances of improbable alignment of the first and second corpora; and fifth means for causing the computer to modify the aligned corpora to remove at least the most improbable corpora alignments.

35. A computer usable medium having computer readable program code means for causing a computer to automate translation of a source text from a source language to a target language, the medium comprising:

first means for causing the computer to store a bilingual database including aligned corpora in the source and target languages;

second means for causing the computer to modify the aligned corpora comprising:

third means for causing the computer to store a database comprising a first and second aligned corpora, each corpus being divided into portions such that at least a subset of the portions of the first corpus are identified by a correspondence relation with respective portions of the second corpus, at least some portions being further divided into plural elementary parts;

fourth means for causing the computer to analyze the aligned corpora to obtain a statistical database;

fifth means for causing the computer to evaluate, using the statistical database, a correlation measure for portions in correspondence relationship chosen from the aligned corpora;

sixth means for causing the computer to identify from the correlation measures of portions in correspondence relationship instances of improbable alignment of the first and second corpora; and seventh means for causing the computer to modify the aligned corpora to remove at least the most improbable corpora alignments eighth means for causing the computer to partition the source text into portions;

ninth means for causing the computer to search the aligned corpus of the source language for portions to match the source text portions; and tenth means for causing the computer to
  (i) for source text portions where a match is found, output the corresponding portion of the target language corpus as a translation for inclusion in an output text, and
  (ii) for portions where no match is found, output a query message indicating that a translation has not been made.

36. A computer usable medium having computer readable program code means for causing a computer to process a bilingual database, the medium comprising:

first means for causing the computer to store a database comprising first and second aligned corpora, each corpus being divided into portions such that at least a subset of the portions of the first corpus are identified by a correspondence relation with respective portions of the second corpus, at least some portions being further divided into one or more elementary parts;

second means for causing the computer to analyze the aligned corpora to obtain a statistical database;

third means for causing the computer to use the statistical database to derive a measure of observed correlation for a plurality of pairs of words, each of the pairs of words chosen one from each corpus;

fourth means for causing the computer to receive a further pair of text portions, one in each of two natural languages;

fifth means for causing the computer to evaluate, for the further pair of text portions a measure of correlation of the portions, by combining the derived correlation measures of word pairs contained in the pair of text portions; and sixth means for causing the computer to output an indication of the likelihood that the further pair of text portions are translations of one another based on the evaluated measure of correlation.

37. A computer usable medium having computer readable program code means for causing a computer to automate translation of a source text from a source language to a target language, the medium comprising:

first means for causing the computer to store a bilingual database comprising aligned corpora in the source and target languages;

second means for causing the computer to partition the source text into portions;

third means for causing the computer to obtain a candidate translation of each source text portion in the form of a candidate target language portion; and fourth means for causing the computer to verify the translation by evaluating a correlation measure for the source language portion and candidate target language portion, said fourth means including;

fifth means for causing the computer to store a database comprising first and second aligned corpora, each corpus being divided into portions such that at least a subset of the portions of the first corpus are identified by a correspondence relation with respective portions of the second corpus, at least some portions being further divided into one or more elementary parts;

sixth means for causing the computer to analyze the aligned corpora to obtain a statistical database;

seventh means for causing the computer to use the statistical database to derive a measure of observed correlation for a plurality of pairs of words, each of the pairs of words chosen one from each corpus;

eighth means for causing the computer to receive a further pair of text portions, one in each of two natural languages;

ninth means for causing the computer to evaluate, for the further pair of text portions a measure of correlation of the text portions, by combining the derived correlation measures of word pairs contained in the pair of text portions; and tenth means for causing the computer to output an indication of the likelihood that the further pair of text portions are likely to be translations of one another based on the evaluated measure of correlation; and eleventh means for causing the computer to output verified candidate portions for inclusion in a target text.

38. A processing apparatus for processing a bilingual database, the processing apparatus comprising:

storage means for storing a database comprising a first and second aligned corpora, each corpus being divided into portions such that at least a subset of the portions of the first corpus are identified by a correspondence relation with respective portions of the second corpus, at least some portions being further divided into plural elementary parts hereinafter referred to as words;

analyzing means for analyzing the aligned corpora to obtain a statistical database;

evaluating means for evaluating, using the statistical database, a correlation measure for the portions in correspondence relationship chosen from the aligned corpora;

identifying means for identifying from the correlation measures of portions in correspondence relationship instances of improbable alignment of the first and second corpora; and modifying means for modifying the aligned corpora to remove at least the most improbable corpora alignments.

39. the processing apparatus of claim 38, for automatic translation of a source text from a source language to a target language, the processing apparatus further comprising:

partitioning means for partitioning the source text into portions;

searching means for searching the aligned corpus or the course language for portions to match the source text portions; and outputting means where a match is found for source text portions, outputting the corresponding portion of the target language corpus as a translation for inclusion in an output text, and where no match is found for source text portions, outputting a message indicating that a translation has not been made, wherein said storage means stores said first and second alignment corpora in the source and target languages.

40. A processing apparatus for processing a bilingual database, the processing apparatus comprising:

storage means for storing a database comprising first and second aligned corpora, each corpus being divided into portions such that at least a subset of the portions of the first corpus are identified by a correspondence relation with respective portions of the second corpus, at least some of the portions being further divided into one or more elementary parts, hereinafter referred to as words;

analyzing means for analyzing the aligned corpora to obtain a statistical database;

deriving means for using the statistical database to derive a measure of observed correlation for a plurality of pairs of words, each pair of words chosen one for each corpus;

receiving means for receiving a further pair of text portions, one in each of two natural languages;

evaluating means for evaluating, of the further pair of text portions, a measure of correlation of the portions, by combining the derived correlation measures of word pairs contained in the pairs of text portions; and outputting means for outputting an indication of the likelihood that the further pair of text portions are translations of one another based on the evaluated measure of correlation.

41. The processing apparatus of claim 40, for automatic translation of a source text from a source language to a target language, the processing apparatus further comprising:

partitioning means for partitioning the source text into portions; and means for obtaining a candidate translation of each of the source text portions in the form of a candidate target language portion, wherein the first and second aligned corpora comprise aligned corpora in the source and target languages, said evaluating means is operative to verify the translation by evaluating a correlation measure of the source language portion and candidate target language portion, and said output means is adapted to output verified candidate potions for inclusions in a target text.

\* \* \* \* \*

UNITED STATES PATENT AND TRADEMARK OFFICE
CERTIFICATE OF CORRECTION

PATENT NO. : 5,867,811
DATED : February 2, 1999
INVENTOR(S) : Timothy Francis O'Donoghue It is certified that error appears in the above-identified patent and that said Letters Patent is hereby corrected as shown below:

Title page item,

[56] REFERENCES CITED

OTHER PUBLICATIONS

"distionnaire he-breu-anglais/anglais-hebreu etabli" should read --dictionnaire hébreu-anglais/anglais-hébreu établi--.

COLUMN 2

Line 28, "revelaed" should read --revealed--.

COLUMN 3

Line 39, "presents" should read --present--.
　　　Line 53, "above mentioned" should read --above-mentioned--.

COLUMN 5

Line 49, "two dimensional" should read --two-dimensional--.

COLUMN 10

Line 50, "Tables 1-8" should read --Tables 1-8,--.

COLUMN 11

Line 20, "Tables 4" should read --Table 4--.
　　　Line 49, "1," should read --1--.

UNITED STATES PATENT AND TRADEMARK OFFICE
CERTIFICATE OF CORRECTION

PATENT NO. : 5,867,811
DATED : February 2, 1999
INVENTOR(S) : Timothy Francis O'Donoghue It is certified that error appears in the above-identified patent and that said Letters Patent is hereby corrected as shown below:

COLUMN 12

Line 33, "which," should read --which--.
    Line 58, "with" should read --within--.

COLUMN 13

Line 2, "vairous" should read --various--.

COLUMN 29

Line 4, "claim 7" should read --claim 7,--.
    Line 32, "claim 1" should read --claim 1,--.
    Line 40, "claim 13" should read --claim 13,--.

COLUMN 30

Line 22, "words ;" should read --words;--.

COLUMN 31

Line 20, "bilingual" should read --a bilingual--.

COLUMN 32

Line 22, "and" should be deleted.
    Line 25, "alignments" should read --alignments;--.

UNITED STATES PATENT AND TRADEMARK OFFICE
CERTIFICATE OF CORRECTION

PATENT NO. : 5,867,811
DATED : February 2, 1999
INVENTOR(S) : Timothy Francis O'Donoghue It is certified that error appears in the above-identified patent and that said Letters Patent is hereby corrected as shown below:

COLUMN 33

Line 12, "and" should be deleted.
    Line 16, "including;" should read --including:--.
    Line 17, indent further.
    Line 24, indent further.
    Line 26, indent further.
    Line 30, indent further.
    Line 33, indent further.
    Line 38, indent further.

COLUMN 34

Line 4, "the" should read --The--
    Line 56, "said" should read --¶ said--.
    Line 62, "potions" should read --portions--.

Signed and Sealed this

Twenty-first Day of December, 1999

Attest:

Q. TODD DICKINSON

*Attesting Officer*      *Acting Commissioner of Patents and Trademarks*